(12) United States Patent
Ackerman

(10) Patent No.: US 10,974,777 B1
(45) Date of Patent: Apr. 13, 2021

(54) SPARE TIRE CARRIER

(71) Applicant: Larry Ackerman, Chandler, AZ (US)

(72) Inventor: Larry Ackerman, Chandler, AZ (US)

( * ) Notice: Subject to any disclaimer, the term of this patent is extended or adjusted under 35 U.S.C. 154(b) by 0 days.

(21) Appl. No.: 16/803,721

(22) Filed: Feb. 27, 2020

Related U.S. Application Data

(60) Provisional application No. 62/930,718, filed on Nov. 5, 2019.

(51) Int. Cl.
*B62D 43/02* (2006.01)
*B60R 9/06* (2006.01)
*B60R 11/00* (2006.01)

(52) U.S. Cl.
CPC ............... *B62D 43/02* (2013.01); *B60R 9/06* (2013.01); *B60R 2011/004* (2013.01); *B60R 2011/0052* (2013.01); *B60R 2011/0066* (2013.01); *B60R 2011/0085* (2013.01)

(58) Field of Classification Search
CPC ................................ B62D 43/02; B62D 43/04
See application file for complete search history.

(56) References Cited

U.S. PATENT DOCUMENTS

| | | | | |
|---|---|---|---|---|
| 4,811,874 A * | 3/1989 | Robison | ................. | B62D 43/02 224/42.21 |
| 4,823,997 A * | 4/1989 | Krieger | ..................... | B60R 9/06 224/42.15 |
| 7,533,789 B1 * | 5/2009 | Seely | ........................ | B60R 9/06 224/282 |
| 9,387,739 B2 * | 7/2016 | Babuska | .................. | B60D 1/52 |
| 2007/0045490 A1 * | 3/2007 | Edwards | ................ | F42B 39/28 248/214 |
| 2014/0054344 A1 * | 2/2014 | Watkins | ................. | B60D 1/075 224/519 |
| 2018/0274572 A1 * | 9/2018 | Wang | ........................ | F16B 2/10 |
| 2019/0150349 A1 * | 5/2019 | Goda | ........................ | B05B 9/04 |

OTHER PUBLICATIONS

Curt Manufacturing LLC, Hitch-Mounted Spare Tire Mount (Fits 2" Receiver) #31006, https://www.curtmfg.com/part/31006, 3 pages.
Overland Bound, DIY-Low Cost Swing Down Hitch Mount Spare Tire Rack, https://www.overlandbound.com/forums/threads/diy-low-cost-swing-down-hitch-mount-spare-tire-rack.15415/, 16 pages.
Roadmaster, Inc., Spare Tire Carrier, https://www.roadmasterinc.com/products/spare_tire/index.php, 3 pages.
Wilco Off-Road, Hitchgate Offset, https://wilcooffroad.com/shop/hitchgate-offset/, 5 pages.
Wilco Off-Road, Hitchgate Solo, https://wilcooffroad.com/shop/hitchgate-solo/, 6 pages.

* cited by examiner

*Primary Examiner* — Scott T McNurlen
(74) *Attorney, Agent, or Firm* — Brian M. Kaufman; Robert D. Atkins; Patent Law Group: Atkins and Associates, P.C.

(57) ABSTRACT

A spare tire carrier has a base tube. A first side plate and second side plate are attached to the base tube. A first pin is disposed between the first side plate and second side plate. A support tube is configured to pivot around the first pin. A tire support bracket is attached to the support tube. A retainer bolt is attached to the support tube above the tire support bracket.

17 Claims, 18 Drawing Sheets

SPARE TIRE CARRIER

CLAIM OF DOMESTIC PRIORITY

The present application claims the benefit of U.S. Provisional Application No. 62/930,718, filed Nov. 5, 2019, which application is incorporated herein by reference.

FIELD OF THE INVENTION

The present invention relates in general to motor vehicles and, more particularly, to a flexible-use spare tire carrier for motor vehicles.

BACKGROUND OF THE INVENTION

Many vehicles sold today have no spare tire included with the vehicle. Most vehicles that do have spare tires included with the vehicle have a spare that is of limited durability and very limited mileage, typically just enough to get the vehicle to a facility for tire repair or replacement. The spare tires tend to be much smaller than the normal tires to fit in a small compartment or storage compartment.

Having a regular size tire easily accessible as a spare makes longer distance travel less stressful. Many have designed and marketed spare tire carriers. However, the spare tire carriers currently on the market have serious limitations and inconveniences. Therefore, a need exists for an improved spare tire carrier.

DETAILED DESCRIPTION OF THE DRAWINGS

Figure 1A:
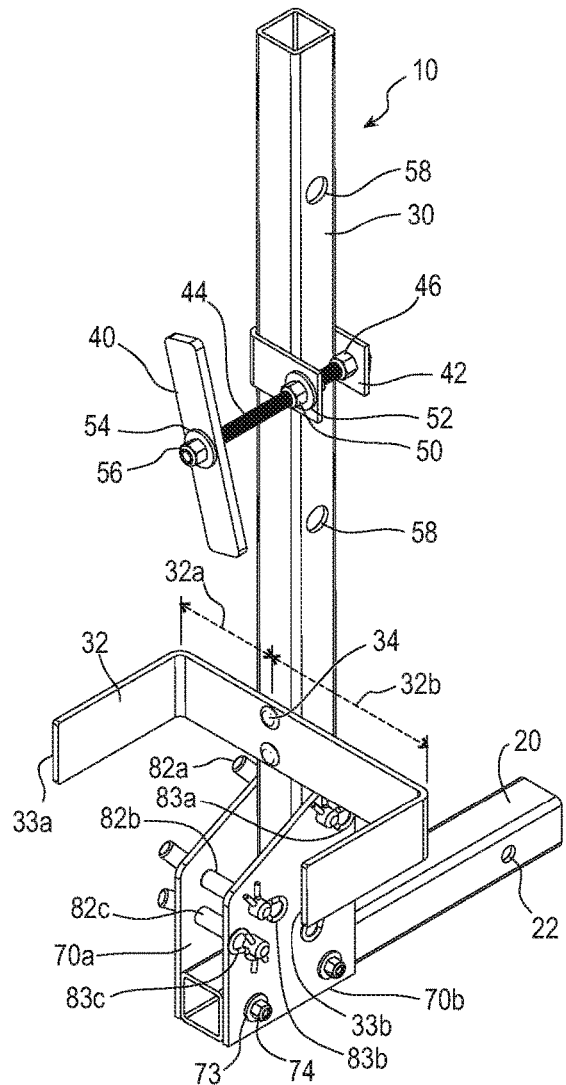
FIGS. 1a-1d illustrate a spare tire carrier.
Figure 1B:
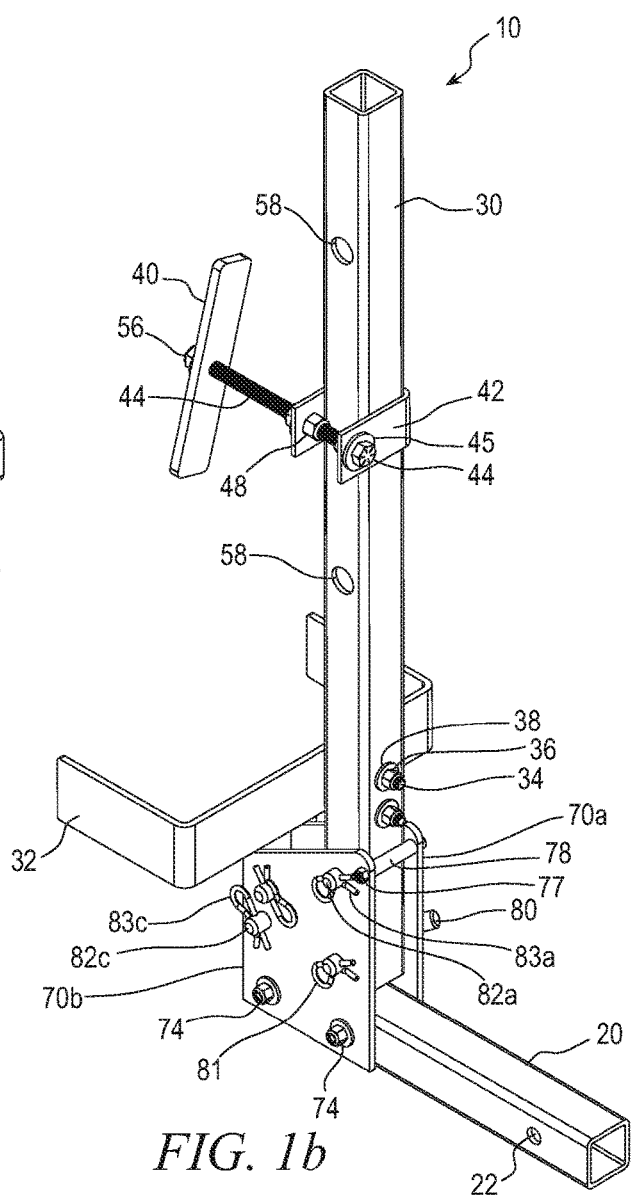
Figure 1C:
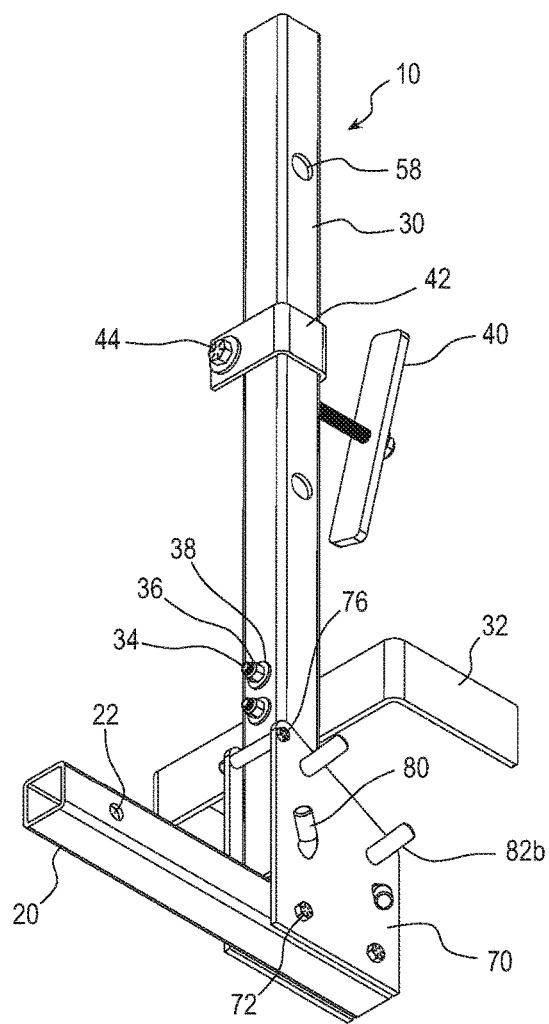
Figure 1D:
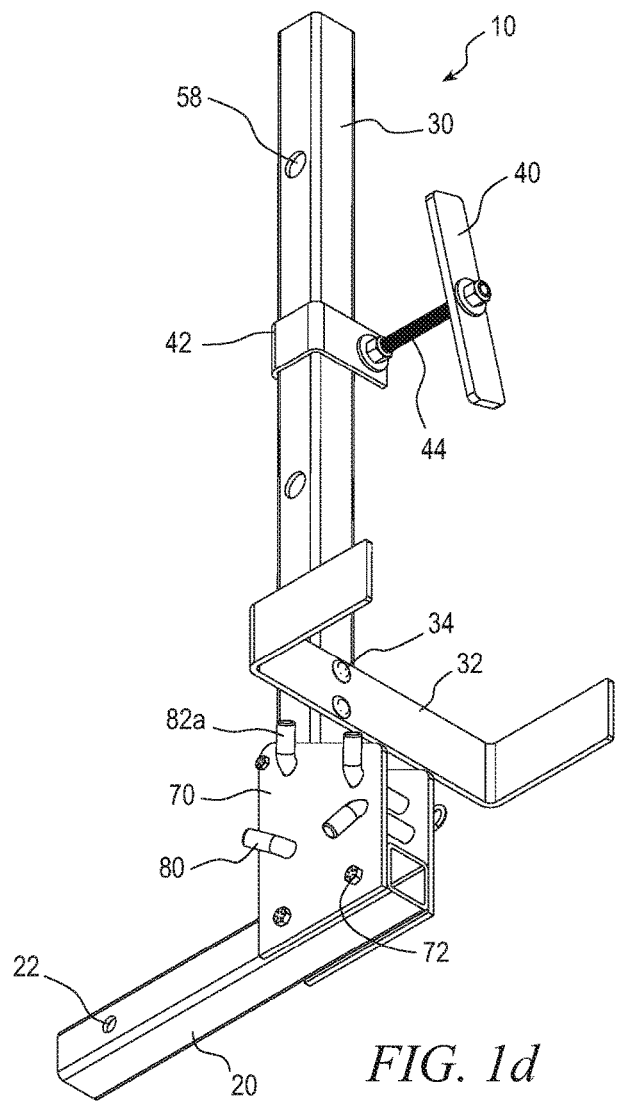

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

FIGS. 1a-1d illustrate four perspective views of spare tire carrier 10. Spare tire carrier 10 is designed to attach to a trailer hitch receiver of a vehicle and hold a spare tire for convenient storage and access. Hitch mount base tube 20 is configured to be insertable into a hitch receiver to install spare tire carrier 10 onto a vehicle. Base tube 20 of the illustrated embodiment is a 2-inch square tube, 16 inches in length, that fits a typical receiver tube of today's trailer hitch receivers. A different size or type of trailer hitch shank can be used for base tube 20 in other embodiments for different hitch receiver configurations. Base tube 20 is typically extruded steel, but other manufacturing methods and materials are used in other embodiments. Holes 22 are formed horizontally through base tube 20 to accept a trailer hitch pin. The trailer hitch pin extends through holes 22 of base tube 20 and corresponding holes in the hitch receiver tube to hold spare tire carrier 10 in the hitch receiver.

Base tube 20 holds carrier 10 in a trailer hitch receiver while support tube 30 holds a spare tire on the carrier. Tire support bracket 32 is attached to support tube 30 and has two arms 33 configured to support the weight of a spare tire setting on the arms. Tire support bracket 32 is attached to support tube 30 by a pair of bolts 34. Bolts 34 are inserted through openings of bracket 32 and support tube 30, and held in place by nuts 36. Washers 38 are disposed onto bolts 34 prior to installing nuts 36 on the bolts to increase the surface area of contact between the nuts and support tube 30. Self-locking nuts 36 can be used to help reduce the likelihood of the nuts falling off bolts 34.

Tire support bracket 32 supports the weight of the spare tire while retainer plate 40 holds the spare tire on carrier 10. A spare tire holding bracket 42 is attached to support tube 30 with a retainer bolt 44 extending from the spare tire holding bracket to hold retainer plate 40. A washer 45 is inserted onto the shank of bolt 44 between the head of the bolt and bracket 42. A nut 46 is used to hold the bolt 44 securely on bracket 42. Nut 48 is disposed on bolt 44 between the two arms of bracket 42. Nut 48 can be turned away from nut 46 to expand the arms of bracket 42 away from each other and loosen the bracket on support tube 30. Washer 50 and nut 52 are disposed on bolt 44 on the complete opposite side of bracket 42 from the bolt head. Nut 52 can be tightened toward the head of bolt 44 to tighten the arms of bracket 42 onto support tube 30.

To store a spare tire on carrier 10, the spare tire is set on tire support bracket 32 with bolt 44 extending through the center of the wheel. Retainer plate 40 is turned down on bolt 44 with washer 54 and nut 56 until the retainer plate is pressing the spare tire against support tube 30.

Support tube 30 is attached to base tube 20 via a pair of side plates 70 and a system of bolts and pins. Bolts 72 are first inserted through openings in one of the side plates 70 (side plate 70a in the figures), then through openings in base tube 20, and finally through openings in the other side plate (side plate 70b in the figures). Washers 73 and nuts 74 are used on the other side of bolts 72 from the bolt heads to press side plates 70 against base tube 20. Nuts 74 are locking nuts in one embodiment. A bolt 76 extends through openings at the top of side plates 70 and is held in place by nut 77. A spacer 78 is disposed on bolt 76 between the side plates. Bolt 76 and nut 77 holds the tops of side plates 70 in position while spacer 78 maintains the spacing between the side plates. Spacer 78 is formed to a length that is the same or substantially the same as the width of base tube 20 to keep side plates 70 parallel with each other.

A bottom end of support tube 30 is attached to side plates 70 via pin 80. Support tube 30 is disposed with the bottom end of the support tube between support plates 70 and an opening through the support tube aligned with openings through the support plates. Pin 80 is inserted through the openings of side plates 70 and support tube 30, and then a retaining pin 81 is disposed on the end of the pin to retain the pin within the openings. The openings of support tube 30 that pin 80 extends through are large enough that the support tube is able to rotate about the pin.

Rotating support tube 30 around pin 80 adjusts the angle of the support tube relative to base tube 20. Pins 82a-82c are inserted through openings of side plates 70, similar to the openings for pin 80. Retaining clips 83a-83c are used to keep the pins in the openings of side plates 70. Pins 82 are used in combination with pin 80 to keep support tube 30 at certain angles relative to base tube 20. Pin 82a is positioned directly above pin 80 and inserted through openings in support tube 30 to hold the support tube vertically. Pins 80 and 82a in combination provide two points of fixed position for support tube 30, thereby maintaining the support tube in a substantially fixed position relative to base tube 20. In some embodiments, support tube 30 leans slightly toward the vehicle in the vertical position to improve balance of the spare tire on pin 80 and reduce the likelihood of a spare tire falling off the carrier. Pin 82a can be removed to lower support tube 30 down to another position.

For temporary lowering, support tube 30 can be lowered down and rested on pin 82b without removing any of the pins other than pin 82a. Setting support tube 30 on pin 82b provides an intermediate angle of the support tube that is generally sufficient to open hatch backs or tailgates of vehicles. Support tube 30 can be lowered farther by removing pin 82b, and then re-inserting pin 82b through the same holes and also through the holes of support tube 30. Pin 83c can be used for an even lower angle of support tube 30. Like pin 82b, support tube 30 can rest on pin 83c without removing the pin, or pin 83c can be inserted through the support tube 30. Pin 83c is positioned to hold support tube 30 substantially horizontal, i.e., parallel to base tube 20, when pin 83c is inserted through side plates 70 and the support tube. Usage of the various lowered positions of support tube 30 is explained in detail below.

Spare tire carrier 10 is conveniently sold and shipped because each of the parts can be distributed separately and then easily assembled by a retailer or end user. Alternatively, the carrier can be shipped and sold in an assembled state. FIGS. 2a-2d illustrate the parts of the base tube assembly of carrier 10 with base tube 20 and side plates 70.

Figure 2B:
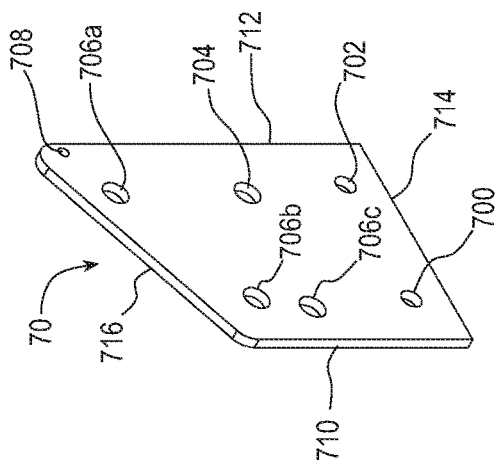
FIGS. 2a-2d illustrate putting together a base tube assembly of the spare tire carrier.
Figure 2A:
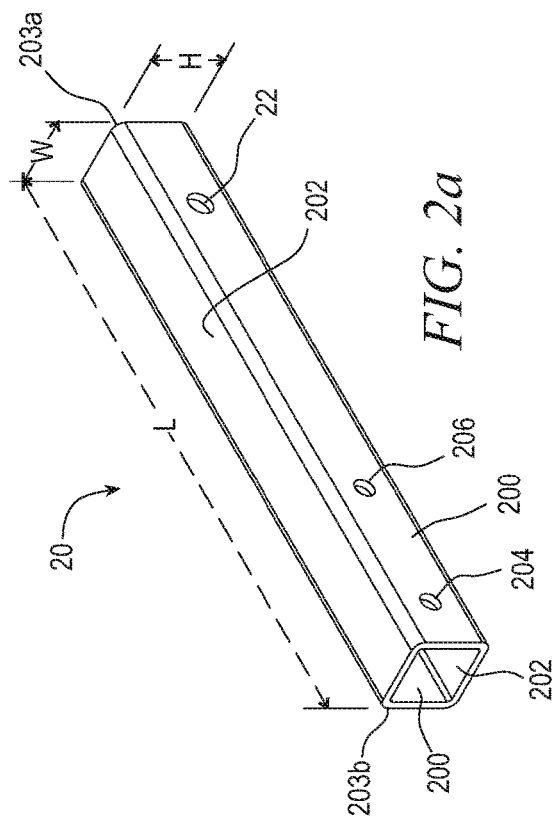

FIG. 2a shows base tube 20 in detail. Base tube 20 has a length indicated by the L axis in FIG. 2a, a width indicated by the W axis, and a height indicated by the H axis. The width and height of base tube 20 are both two inches to meet the hitch receiver standard. The height and width can be adjusted to fit other hitch receiver standards as necessary, e.g., 1.25-inch or 2.5-inch receivers. Base tube 20 can be non-square or non-rectangular in other embodiments if desired. The length of base tube 20 is sixteen inches. The length can be modified as desired to adjust the distance of support tube 30 from the hitch receiver.

Base tube 20 has a substantially square profile when viewed along the length axis. The square profile is formed by four equally sized sides of base tube 20, sides 200 and top and bottom 202. Other shapes beside square could be used if a trailer hitch receiver standard called for other shapes, although typically only square would be used. A side wall thickness of sides 200 and top and bottom 202 is 0.187 inches. Top and bottom 202 are identical to each other, and sides 200 are also identical to each other. Base tube 20 can be flipped over 180-degrees around the L axis and there would be no readily apparent difference to a viewer.

Base tube 20 has a first end 203a and a second end 203b. First end 203a is the end of base tube 20 that is inserted into a hitch receiver. Second end 203b is the end of base tube 20 that will have side plates 70 mounted thereto. Openings 22 are formed in both sides 200 to accept a pin to hold base tube 20 within a hitch receiver. Openings 22 are formed 2.5 inches from end 203a, although the exact distance is not critical, and are centered between top and bottom 200. A diameter of openings 22 is 0.63 inches to fit the standard hitch receiver retaining pin.

Openings 204 and 206 are formed in sides 200 at 1.25 and 4.75 inches from end 203b, respectively. Openings 204 and 206 are positioned to align with openings in side plates 70 to allow the side plates to be mounted by bolts. Openings 204 and 206 have diameters of 0.5 inches and are vertically centered between top and bottom 202.

FIG. 2b shows a perspective view of side plate 70. Side plate 70 is cut from a ¼-inch thick sheet of hot-rolled steel in one embodiment. Holes 700, 702, 704, and 706a-706c are drilled or otherwise formed through side plate 70. Side plate 70 has a rear edge 710 that will be oriented away from the vehicle when carrier 10 is installed, and front edge 712 opposite the rear edge. Holes 700 and 702 are formed with centers approximately one inch up from bottom edge 714 so that, when holes 700 and 702 are aligned with holes 204 and 206 of base tube 20, the bottom of the base tube aligns with bottom edges 714 of side plates 70. Hole 700 is formed 1.25 inches from rear edge 710, and hole 702 is formed 4.75 inches from the rear edge, so that holes 700 and 702 align with holes 204 and 206 of base tube 20 while end 203b of the base tube aligns with rear edge 710 of side plate 70. Holes 700 and 702 each have a ½-inch diameter to match holes 204 and 206 of base tube 20.

Hole 704 corresponds to the location of pin 80 in FIGS. 1a-1d, while holes 706a-706c correspond to the locations of pins 82a-82c, respectively. Holes 704 and 706a-706c each have a diameter of 0.630 inches. Each hole 706a-706c has a center that is 3.5 inches from a center of hole 704 to match a distance between corresponding holes of support tube 30. Hole 706a is oriented directly above hole 704, i.e., in a direction parallel to rear edge 710 and front edge 712. The vertical alignment of holes 704 and 706a keeps support tube 30 vertical when the support tube is aligned with openings 704 and 706a. Hole 706b is angled down 67 degrees from vertical. That is, a line through the centers of holes 704 and 706b would form a 67-degree angle with front edge 712. The location of hole 706b controls the angle of support tube 30 when the support tube is aligned with hole 706b or resting on pin 82b. The angle of support tube 30 when the support tube is supported by pin 82b can be customized by adjusting the location of hole 706b. Hole 706c is located directly behind hole 704, i.e., in a direction parallel to bottom edge 714. The horizontal alignment of holes 704 and 706c keeps support tube 30 horizontal when the support tube is aligned with openings 704 and 706c.

Figure 2C:
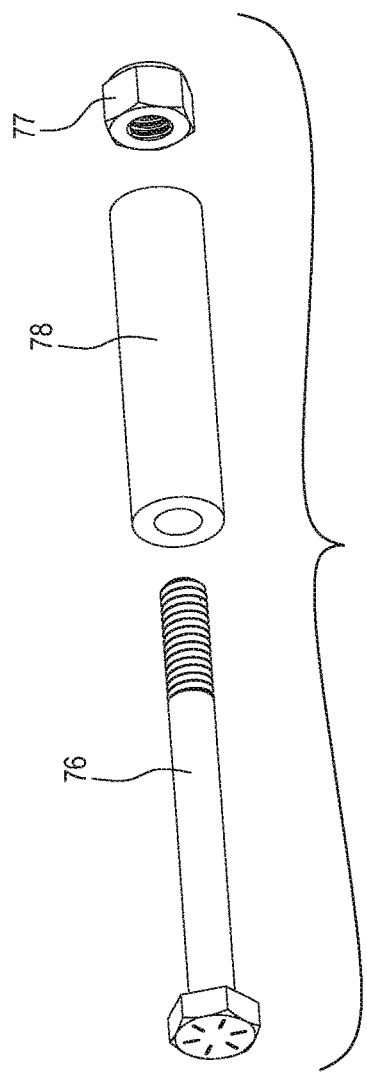

Hole 708 is formed in the top-front corner of side plates 70 for placement of bolt 76 and spacer 78, shown in FIG. 2c near the intersection of front edge 712 and top edge 716. Hole 708 is formed near the front of side plate 70 to be out of the normal range of motion of support tube 30. Bolt 76 with spacer 78 will help block motion of support tube 30 toward the vehicle, which will help reduce the likelihood of the support tube inadvertently swinging forward and damaging the vehicle. Opening 706 has a ¼-inch diameter in one embodiment. Bolt 76 is a ¼-inch bolt, and spacer 87 is a two-inch long tube with a ½-inch outer diameter and a ¼-inch inner diameter. Other sizes can be used in other embodiments. Nut 77 can be a locking nut.

Figure 2D:
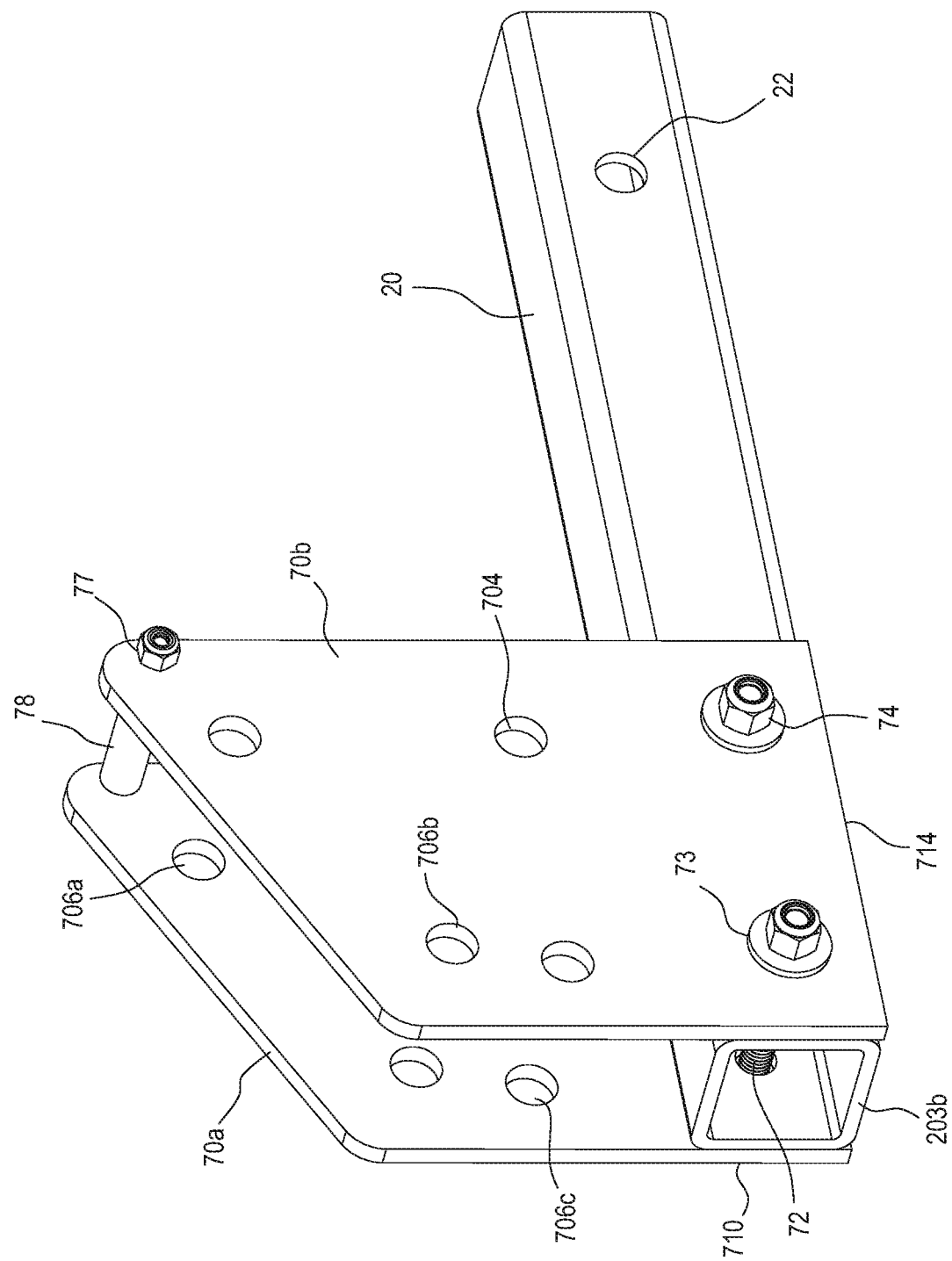

FIG. 2d shows base tube 20 and side plates 70 assembled. Two substantially identical side plates 70 are used, with one side plate disposed on each side of base tube 20. Openings 700 and 702 of side plates 70 are aligned to holes 204 and 206 of base tube 20 so that bolts 72 can be disposed through the holes of both side plates and the base tube. Washers 73 and nuts 74 are disposed on bolts 72 opposite the bolt heads and tightened down to attach side plates 70 to base tube 20. Bolts 72 are ½-inch bolts to correspond to the size of the holes. Nut 74 is a locking nut in some embodiments. At this stage of assembling carrier 10, nuts 74 can be tightened just enough to hold side plates 70 close to base tube 20, allowing some shift in the relative positions to ensure sufficient alignment of other parts being assembled.

Spacer 78 is disposed between openings 708 of side plates 70, and then bolt 76 is disposed through both openings 708 and the spacer. Nut 77 is screwed down onto bolt 76 opposite the bolt head to tighten down the tops of side plates 70 against spacer 78. As with nuts 75, nut 77 can be left slightly loose to allow a little movement of the parts' relative positions to accommodate later alignment.

Next, FIGS. 3a-3f show the upper portion of carrier 10, with support tube 30, tire support bracket 32, and retainer plate 40 being assembled. Support tube 30 has a length of 36 inches indicated by the L axis in FIG. 3a. A longer support tube 30 could be used to allow storage of larger spare tires, or a shorter support tube could be used. Support tube 30 has a width and height of two inches to match the width and height of base tube 20. Support tube 30 and base tube 20 can be extruded using the same die and material, and simply cut to different lengths and have holes drilled at different locations. The two-inch width of support tube 30 allows the support tube to fit snugly between side plates 70, which reduces lateral motion of the support tube and rattling between the support tube and side plates while driving with carrier 10 installed.

Support tube 30 has side faces 300, front and back faces 302, bottom end 303a, and top end 303b. Each side has a thickness of 0.188 inches. As with base tube 20, support tube 30 is symmetrical. Side faces 300 are identical to each other, and front and back faces 302 are identical to each other. Holes 304 and 306 are drilled through both side faces 300 near bottom end 303a. Hole 304 is formed with a center that is one inch from bottom end 303a, and hole 306 is formed 4.5 inches from the bottom end. Hole 304 is the hole that pin 80 extends through to allow support tube 30 to pivot relative to base tube 20. Hole 304 is close enough to lower end 303a that the lower end will not contact base tube 20 while rotating.

The gap of 3.5 inches between holes 304 and 306 matches the gaps between hole 704 and each of holes 706a-706c to allow hole 306 to line up with any of the holes 706 when support tube 30 pivots around the pin through holes 704 and 304. Holes 304 and 306 have diameters of 0.630 inches to match the diameters of holes 704 and 706. Holes 58 are formed at a distance of 6 inches and 19.5 inches from top end 303b, and with diameters of 1.0 inch. Each of holes 58, 304, and 306 are centered between front and back faces 302.

Holes 308 are drilled through both front and back faces 302 with a diameter of 0.375 inches. Holes 308 are centered between side faces 300 at a distance of 7 inches and 8.5 inches from bottom end 303a. The 1.5 inch spacing between holes 308 matches a spacing of 1.5 inches between holes 328 of tire support bracket 32. Holes 328 also have diameters of 0.375 inches to match holes 308.

Figure 3B:
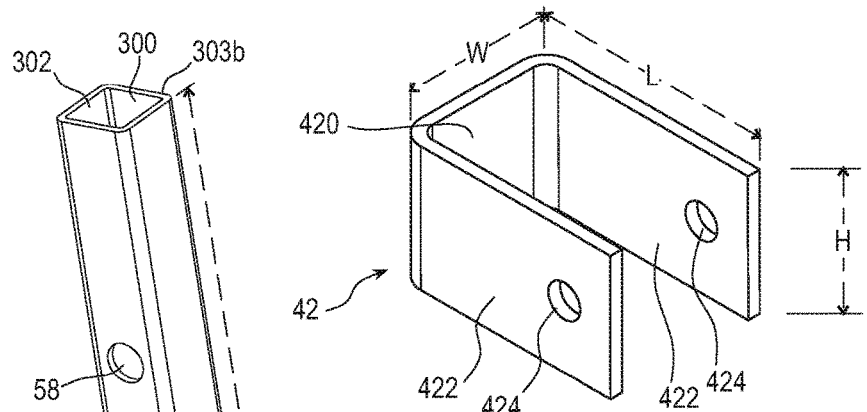
FIGS. 3a-3f illustrate putting together a support tube assembly of the spare tire carrier.
Figure 3C:
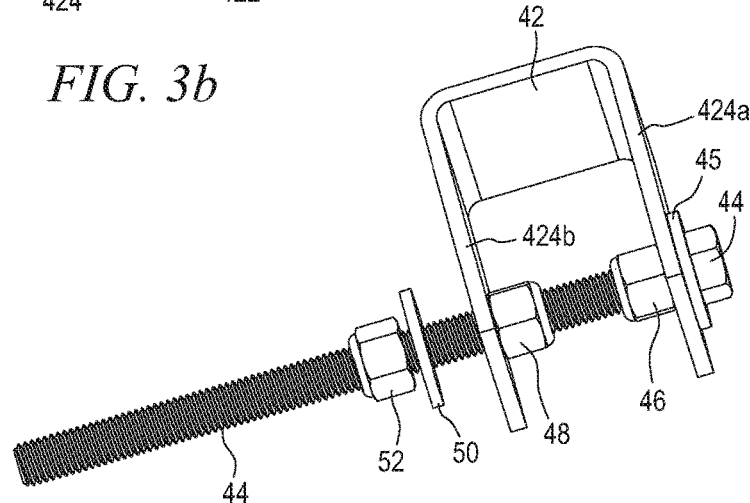
Figure 3A:
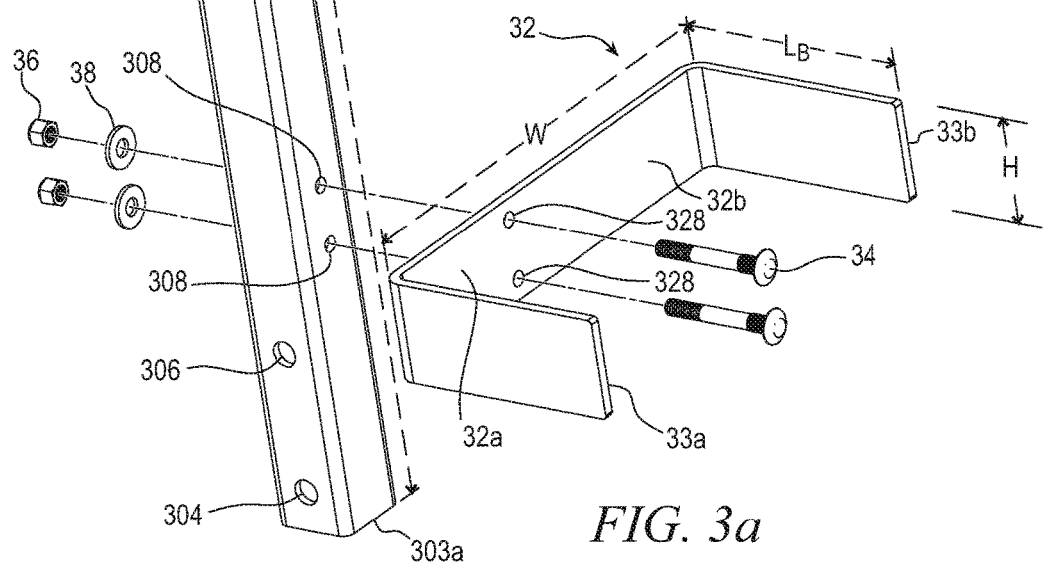

Tire support bracket 32 has an overall width of 12 inches illustrated by the W axis in FIG. 3a, with two arms 33 having lengths of 6 inches each illustrated by the $L_B$ axis. The height of bracket 32, illustrated by the H axis, is 2.5 inches. A thickness of bracket 342 is 0.25 inches. Bracket 32 can be cut into a two-foot by 2.5-inch piece from a ¼-inch sheet of hot-rolled steel, and then holes 328 are drilled and arms 33 are bent to ninety-degree angles.

The centers of holes 328 are drilled 1.5 inches apart, and 0.5 inches from the top and bottom of bracket 32. The centers of holes 328 are 4.5 inches from left arm 33a and 7.5 inches from right arm 33b, which means that side 32b sticks out an extra 3 inches from the center of support tube 30 compared to side 32a of bracket 32. The purpose of mounting bracket 32 off center is to align the center of bracket 32 with retainer bolt 44, as will be explained below.

Bracket 32 is attached to support bracket 34 by bolts 34. Bolts 34 have a 3-inch length and ⅜-inch shank diameter. Bracket 32 is disposed adjacent to support bracket 30 with holes 328 aligned to holes 308. Bolts 34 are disposed through holes 328 and 308. Washers 38 and nuts 36 are used to tighten down bracket 32 against support tube 30. Nuts 36 can be left somewhat loose to allow later adjustment of bracket 32, or fully tightened down at this stage. Adjustment of bracket 32 is usually not necessary.

Bolts 34 have a smooth domed head to give bracket 32 an exposed face that is smooth. In other embodiments, bolts 34 have heads with a driving mechanism such as a phillips screw drive, torxs drive, or an external hex drive. Bolts 34 have knurled splines 340 formed on the shank adjacent to the head to reduce rotation within holes 328 when trying to tighten nuts 36. Alternatively, bolts 34 can be carriage bolts.

FIG. 3b illustrates spare tire holding bracket 42 that is used to attach retainer bolt 44 to support tube 30. Bracket 42 has a rear portion 420 that provides a two-inch width to the bracket. The two-inch width corresponds to the two-inch width of support tube 30, which allows two arms 422 of bracket 42 to both set in contact with respective side surfaces 300 of support tube 30. In one embodiment, arms 422 are 2.02 inches apart from each other. Arms 422 each have a length of 3.25 inches with holes 424 formed 0.75 inches from the ends of each respective arm 422 opposite rear portion 420. Bracket 42 has a two-inch height with holes 424 having a 0.512-inch diameter and being centered within the height. Bracket 42 can be formed from a sheet of rolled steel 0.188 inches thick. The sheet is cut to size, holes 424 are drilled, and bent to form arms 422.

FIG. 3c illustrates spare tire holding bracket 42 assembled with retainer bolt 44. Bolt 44 is an eight-inch long and ½-inch diameter bolt in one embodiment. Bolt 44 is inserted through one of the openings 424 with washer 45 between the bolt head and bracket 42, and nuts 46 and 48 are installed on the bolt prior to inserting the bolt through the second opening 424. Nut 46 is tightened down on the first arm 424a to hold bolt 44 within bracket 42. Nut 46 is a locking nut in some embodiments. Nut 48 is provided between arms 424 as a means to temporarily increase physical separation between the two arms. As illustrated in FIG. 3c, nut 48 is screwed against arm 424b to stretch bracket 42 and increase the gap between arms 424. The increased gap is used to facilitate sliding of bracket 42 onto support arm 30.

Nut 52 and washer 50 can be added at this stage or once bracket 42 is installed on support arm 30. If nut 52 is added before the positioning procedure shown in FIG. 3d, the nut should be loosely installed to ensure that the position of bracket 42 is adjustable on support tube 30. Bracket 42 is installed on support tube 30 by sliding the bracket onto top end 303b and down toward the middle of the support tube. Bracket 42 is installed with retainer bolt 44 extending away from support tube 30 in parallel to, and in the same direction as, arms 33 of tire support bracket 32.

Figure 3D:
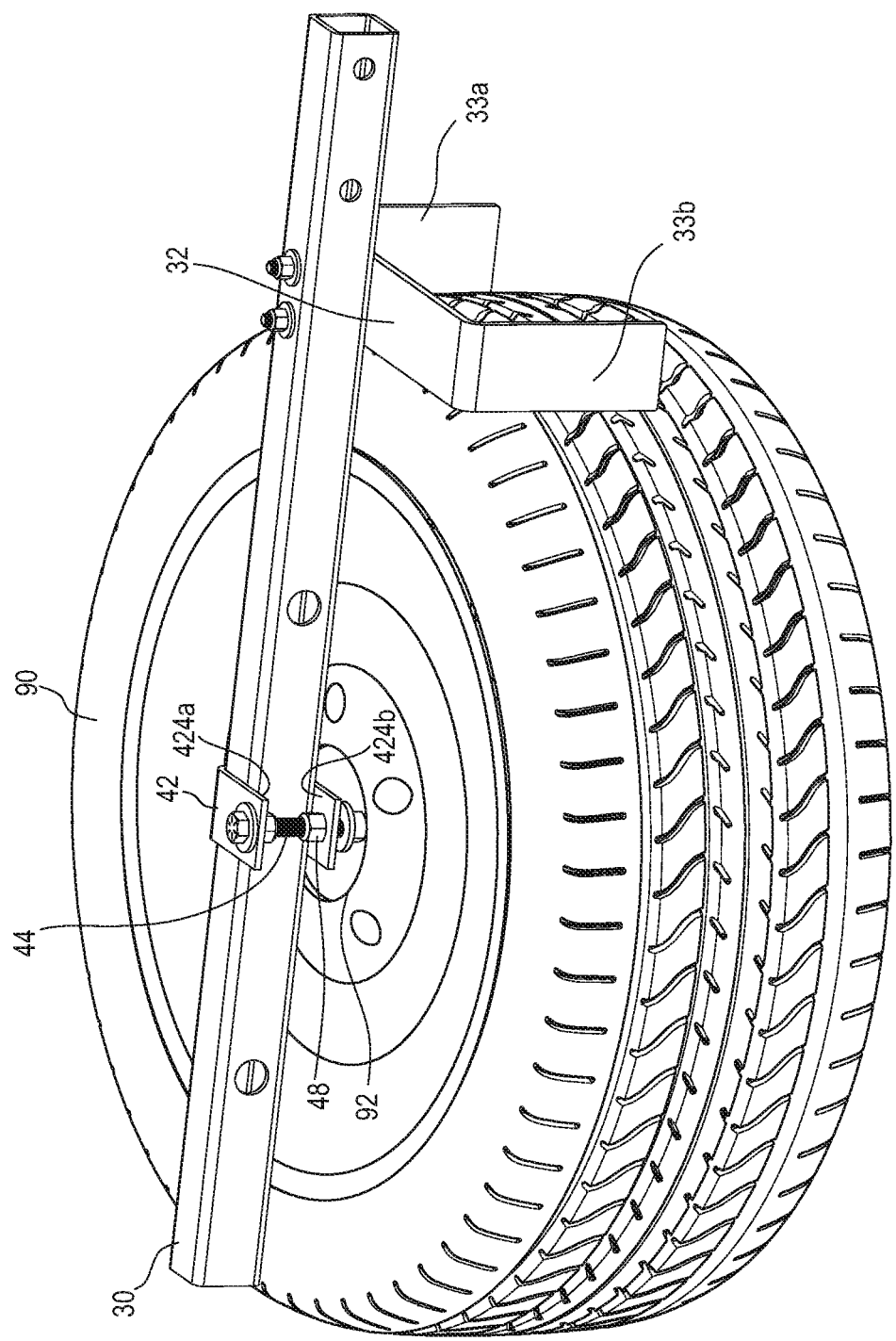

Once bracket 32 and bracket 42 with bolt 44 are disposed on support tube 30, the tube can be laid on top of the tire to be carried in order to properly position the bolt. The tire can be disposed on the ground or a floor. FIG. 3d shows support tube 30 set on tire 90 in roughly the position that the tire would be in during storage on carrier 10. Arms 33 of bracket 32 are in contact with tire 90, and bolt 44 is positioned to extend through center opening 92 of the wheel without touching the inside of the opening. If bolt 44 does not extend through opening 92 with arms 33 in contact with tire 90, the user adjusts the position of bracket 42 on support tube 30 until the bolt is within opening 92.

With bolt 44 properly positioned, nut 48 can be loosened away from arm 424b to allow arms 424 to compress onto support tube 30. A mark can be made on support tube 30 next to bracket 42 so that the position can be recalled without having to go through the same exercise. Nuts 36 can be tightened to fix the position of bracket 32 once the lateral position of bolt 44 is confirmed within opening 92. Support tube 30 can then be picked up, and nut 52 can be tightened down to increase the clamping force of arms 424 against support tube 30. A lock washer can be added between arm 424b and nut 52 instead of or along with flat washer 50.

Figure 3F:
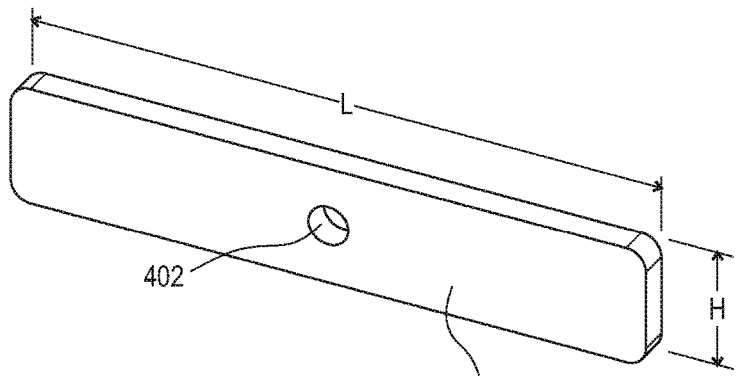
Figure 3E:
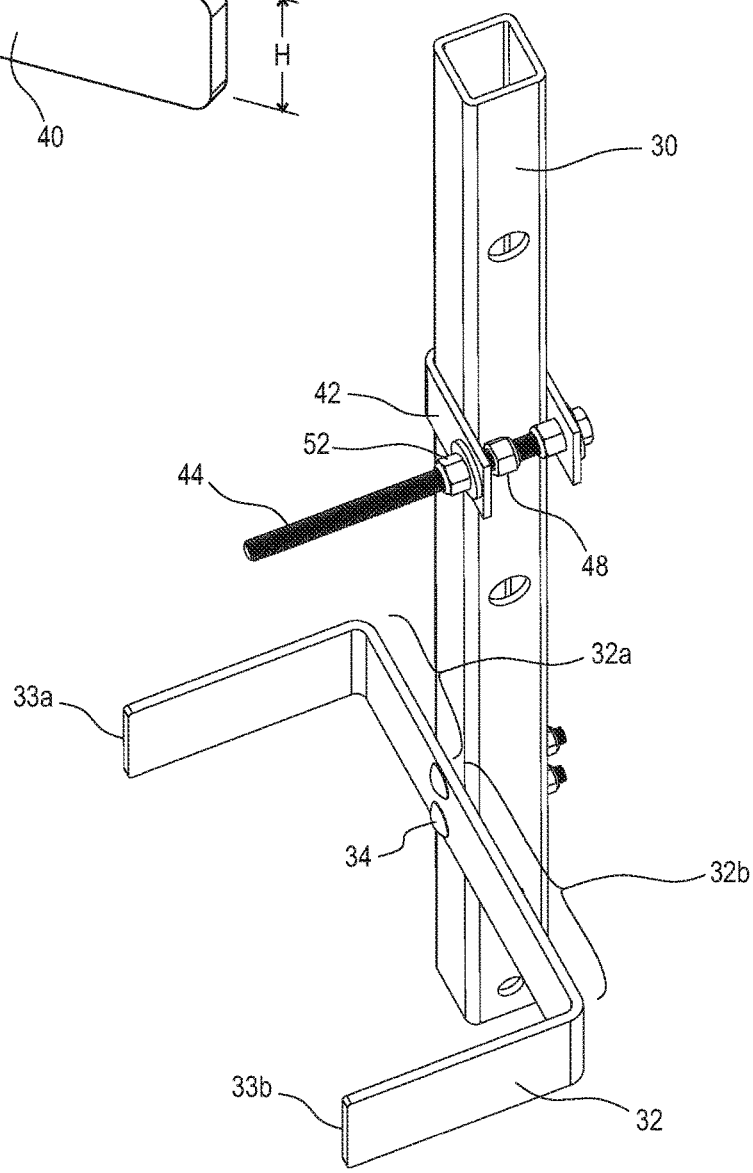

FIG. 3e shows brackets 32 and 42 installed on support tube 30. When a tire is sitting on arms 33, bolt 44 should extend through the middle of the tire. The nature of bracket 42 results in retainer bolt 44 being disposed off to one side or the other of support tube 30. Bolt 44 and the longer side of bracket 32 can be disposed on either side of support tube 30, but both should be on the same side of the support tube to ensure proper alignment. Ideally, bolt 44 will be located directly above the center of bracket 32, although any location of bolt 44 will work as long as the bolt can extend through a tire to be loaded onto the carrier.

FIG. 3f illustrates detail of retainer plate 40. Retainer plate 40 goes onto retainer bolt 44 with a spare tire between the retainer plate and support tube 30 to hold the tire. Nut 56 is used to hold retainer plate 40 on bolt 44. Retainer plate 40 has a length of 8 inches, a height of 1.5 inches, and a thickness of 0.38 inches. A 0.5-inch opening 402 is formed through the center of plate 40 to accommodate bolt 44. Plate 40 can be cut from a sheet of hot rolled steel.

FIGS. 4a-4g illustrate installing carrier 10 on a vehicle 100. Vehicle 100 is an SUV that includes a rear hatchback door 102. Carrier 10 is also compatible with other types of hatchback vehicles, pickups and other vehicles with tailgates that swing downward, and any other vehicle with a hitch receiver. Hatchback door 102 can be opened prior to installing carrier 10 if desired. Vehicle 100 includes a hitch receiver 104 configured to the same standard as base tube 20 of carrier 10, e.g., to accept a 2-inch by 2-inch tube.

Figure 4A:
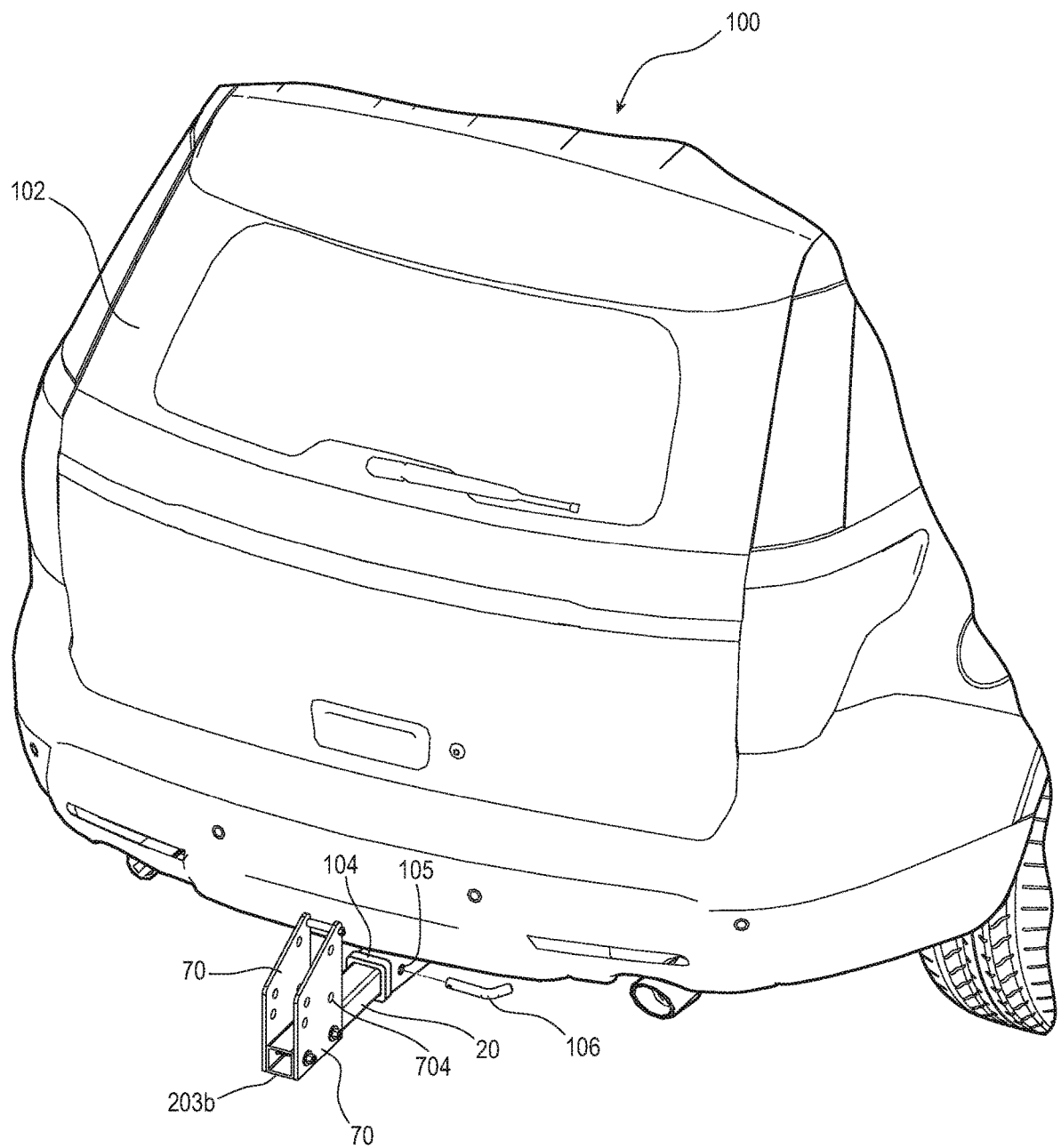
FIGS. 4a-4g illustrate installing the spare tire carrier on a vehicle and storing a tire on the carrier.

Installing carrier 10 begins by inserting base tube 20 into hitch receiver 104 with side plates 70 oriented upward as shown in FIG. 4a. Hitch receiver 104 includes holes 105 that correspond to holes 22 of base tube 20. Base tube 20 is inserted into hitch receiver 104 until holes 22 are aligned with holes 105. Pin 106 is inserted through holes 105 and 22 to latch base tube 20 into hitch receiver 104. Pin 106 is a ⅝-inch diameter pin to correspond to the size of the holes. A retainer pin can be used to keep pin 106 in holes 105 and 22. A locking pin 106 that requires a key to remove the pin can be used to reduce the likelihood of theft of carrier 10.

Figure 4B:
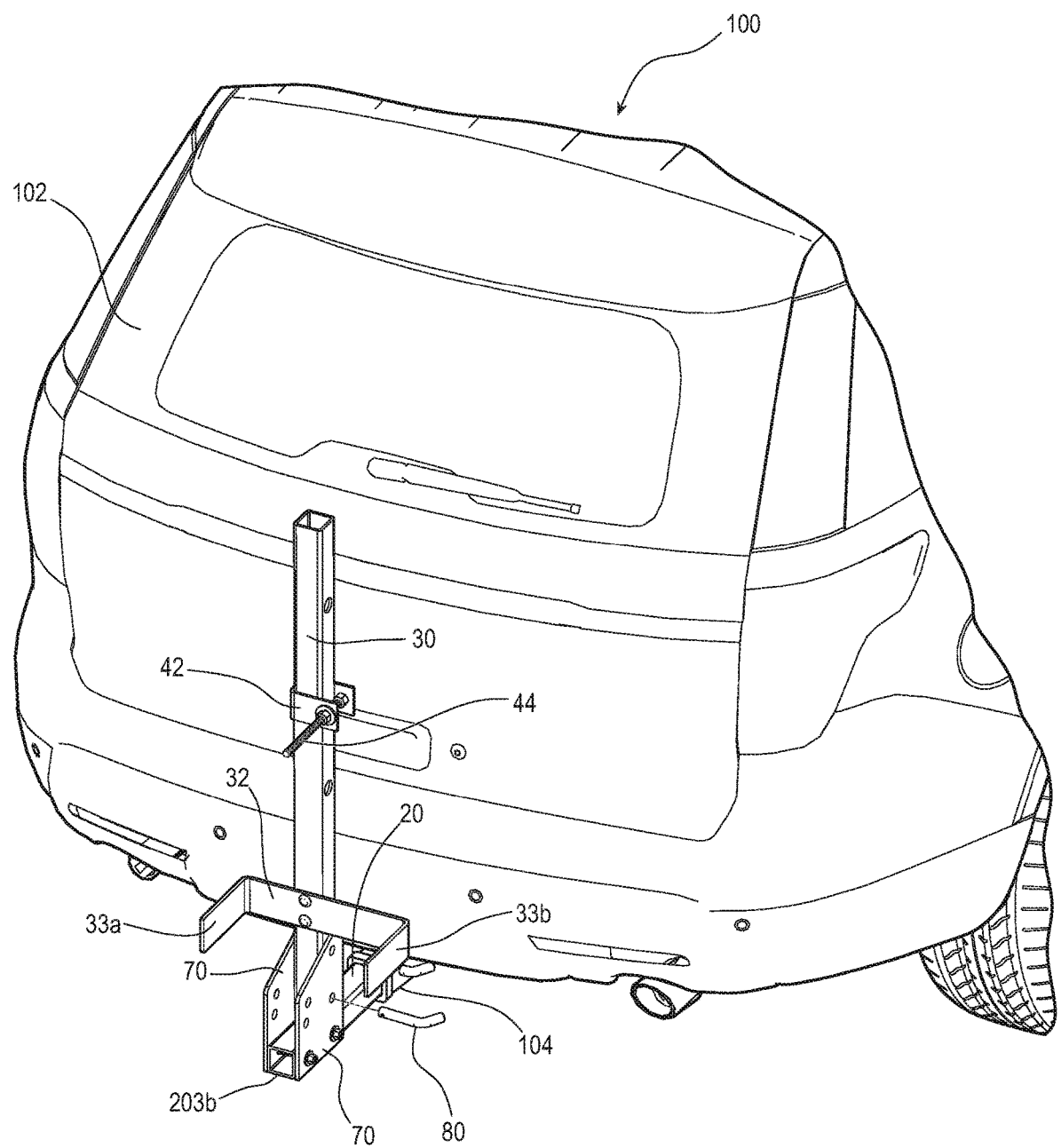

FIG. 4b illustrates attaching support tube 30 to base tube 20 via side plates 70 to complete carrier 10. Lower end 303a of support tube 30 is inserted between side plates 70 with bolt 44 and arms 33 of tire support bracket 32 extending away from rear door 102. Support tube 30 is positioned so that openings 304 of sides 300 are aligned with openings 704 of side plates 70. Pin 80 is inserted through openings 704 and 304 to hold bottom end 303a between side plates 70. Pin 80 is a ⅝-inch diameter pin to correspond to the sizes of the openings. A locking pin that requires a key to remove can be used to reduce the likelihood of support tube 30 being stolen, potentially along with a spare tire.

Figure 4C:
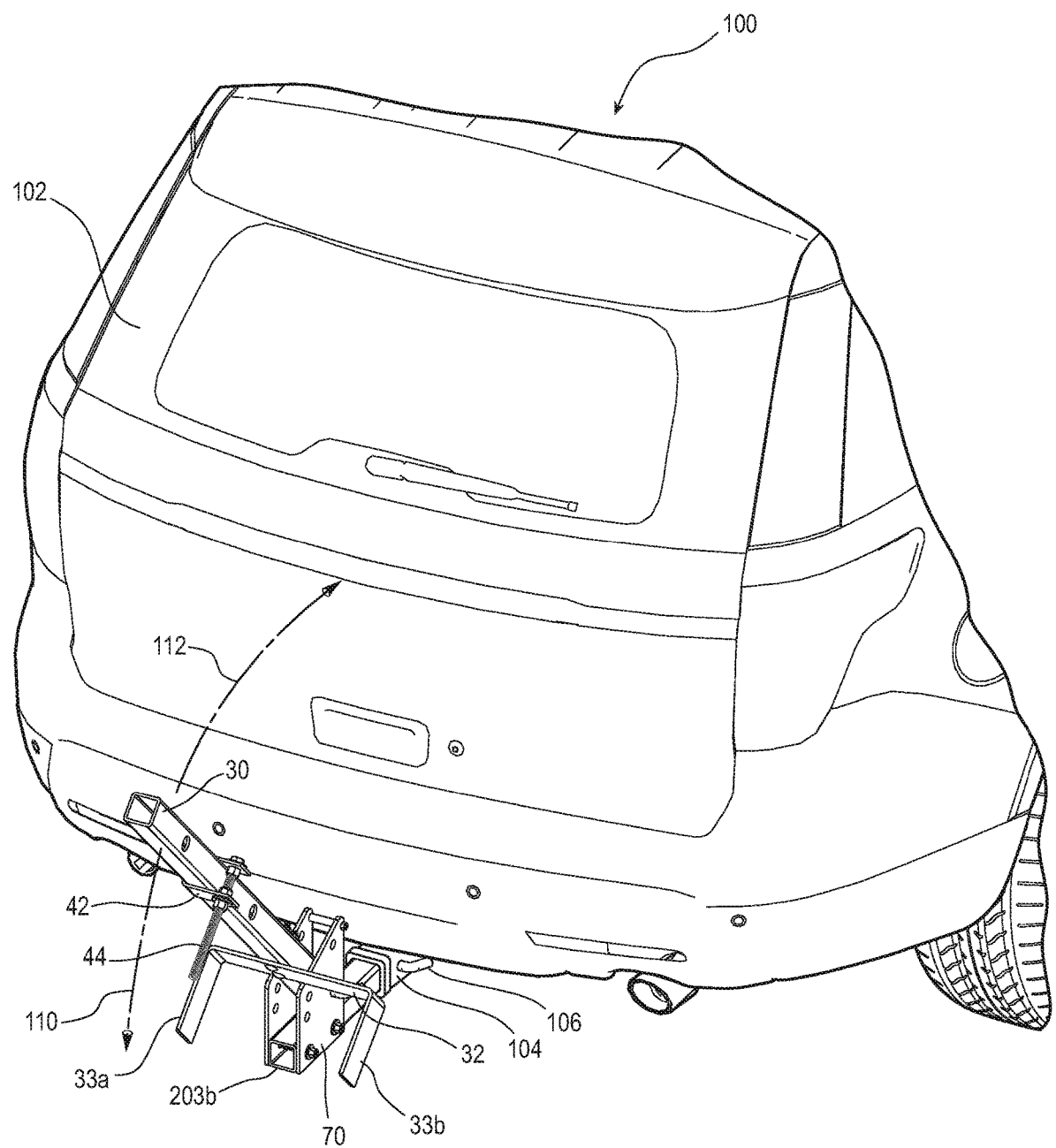

Pin 80 allows support tube 30 to pivot or rotate about the pin between side plates 70, as illustrated in FIG. 4c. Movement in the direction of arrow 110 is referred to as lowering, and movement in the direction of arrow 112 is referred to as raising. Lowering support tube 30 allows rear door 102 to be opened without removing carrier 10 or tire 90 once stored.

Figure 4D:
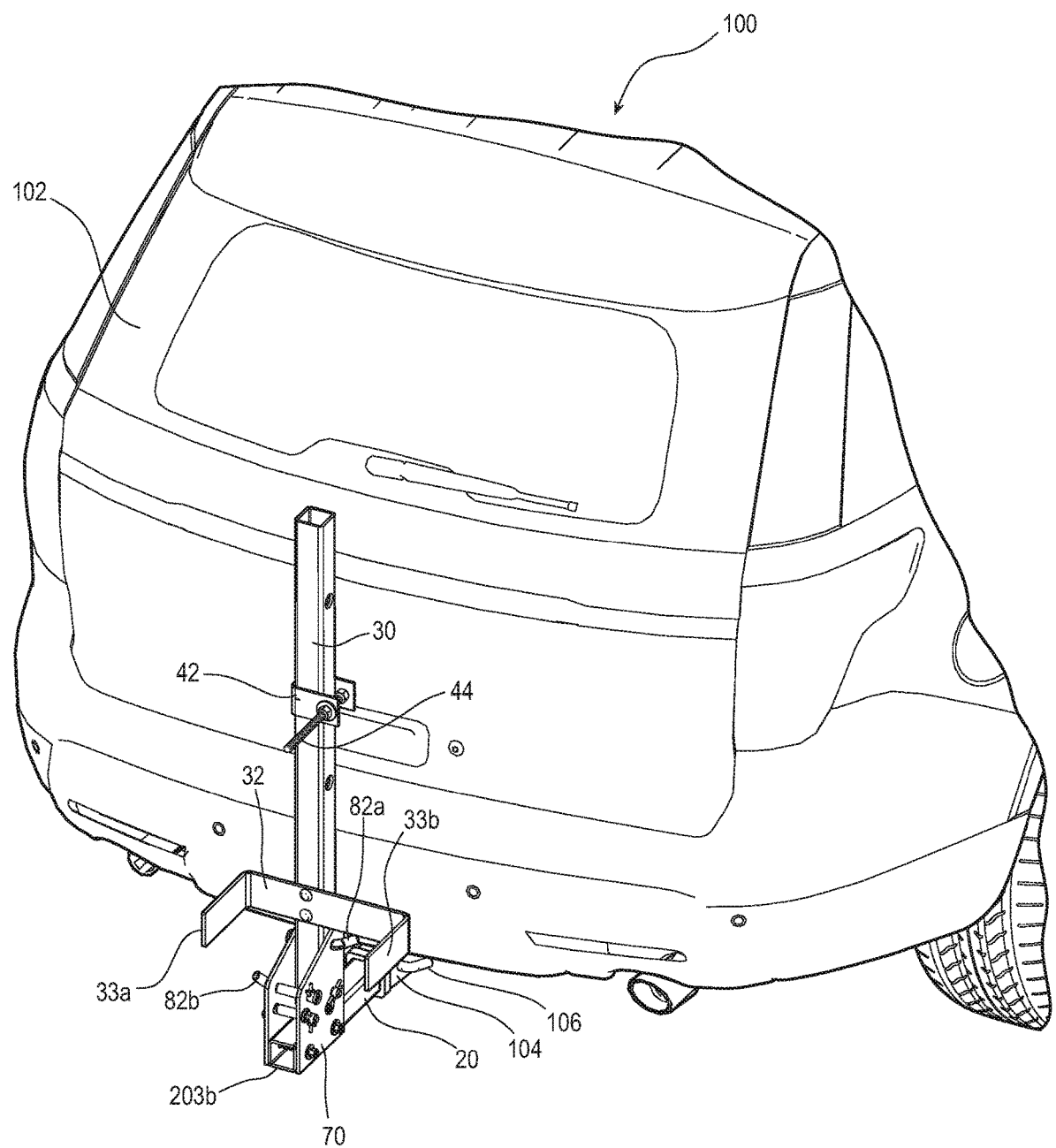

Pins 82a-82c are inserted through holes 706a-706c, respectively, in FIG. 4d. Pins 82a-82c have ⅝-inch diameters to match their respective openings. For initial storage of tire 90, support tube 30 is positioned vertically with pin 82a through not only holes 706a of side plates 70, but also holes 306 of the support tube. Pins 82b and 82c can be left out for now, or never used at all. A single pin 82 could be moved between holes 706a-706c as needed to position support tube 30. In combination, pins 80 and 82a extending through both side plates 70 and support tube 30 results in the support tube being maintained in a substantially vertical orientation.

At this stage, with carrier 10 completely assembled and installed on vehicle 100, all of the bolts that were previously left slightly loose to allow some play in components can be fully tightened down. Typically, at least bolts 72 and 77 are left loose to allow play in side plates 70 and ensure proper fit of support tube 30. Bolts 34 that hold on tire support bracket 32 may also have been left loose and need to be tightened. All nuts and bolts included with carrier 10 should be tightened prior to or at this stage, other than nut 56 that holds on the spare tire.

Figure 4E:
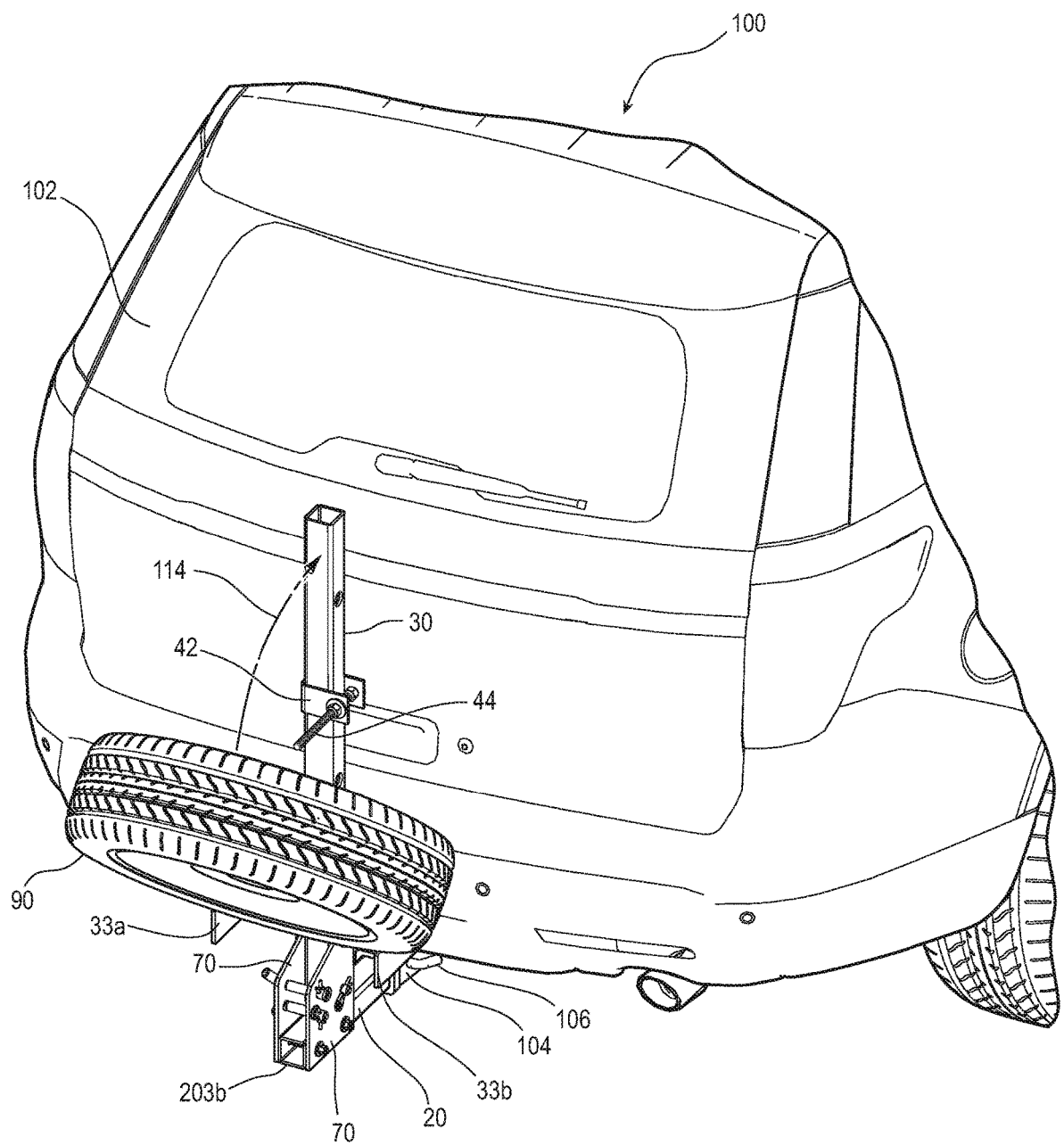

FIG. 4e shows tire 90 hoisted up onto tire support bracket 32 of carrier 10. With the weight of tire 90 being supported by bracket 32, the tire is leaned forward as indicated by arrow 114 so that bolt 44 extends through the middle of the tire. Tire 90 can also be lifted in a vertical orientation and placed with bolt 44 through the tire before setting the tire down on bracket 32.

Figure 4F:
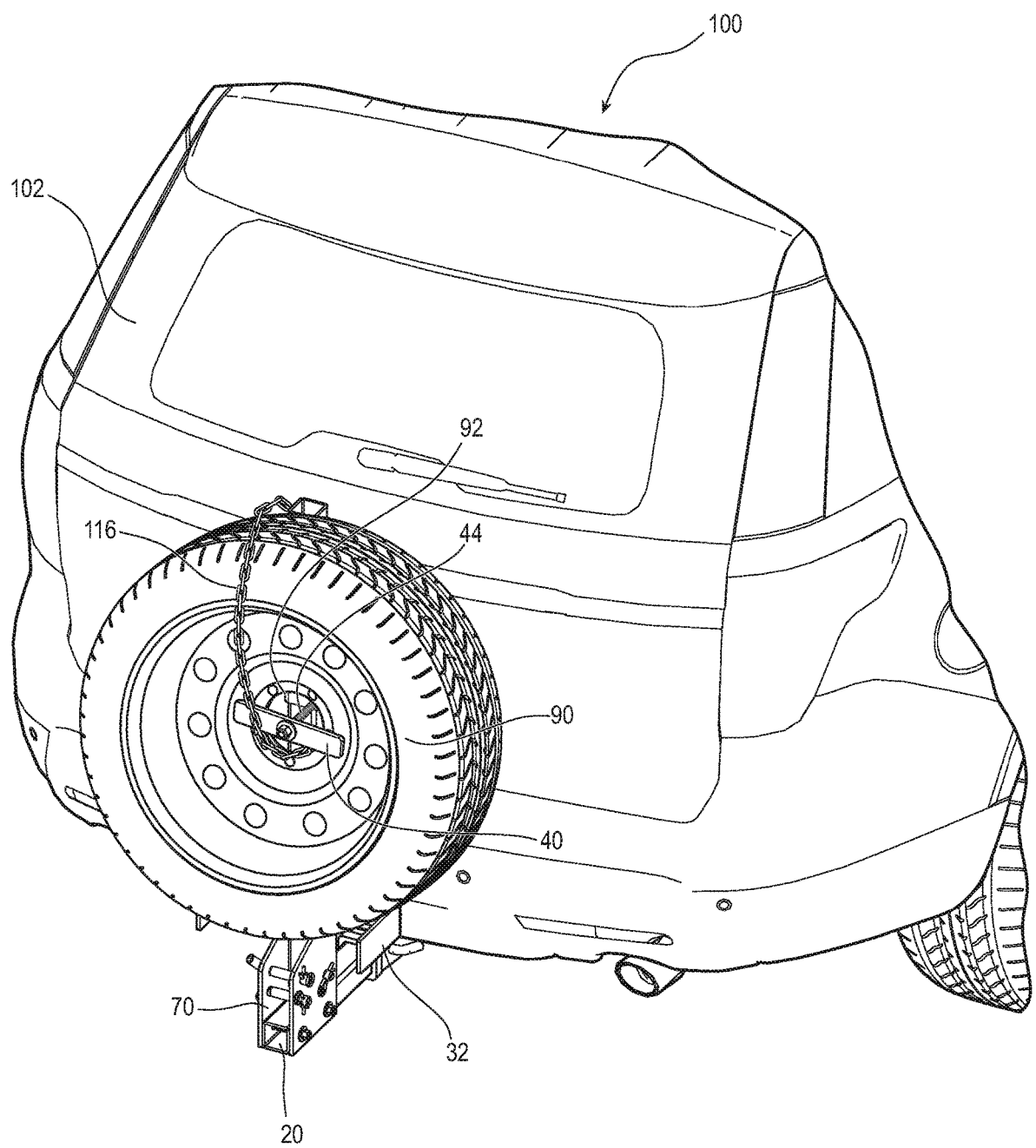
Figure 4G:
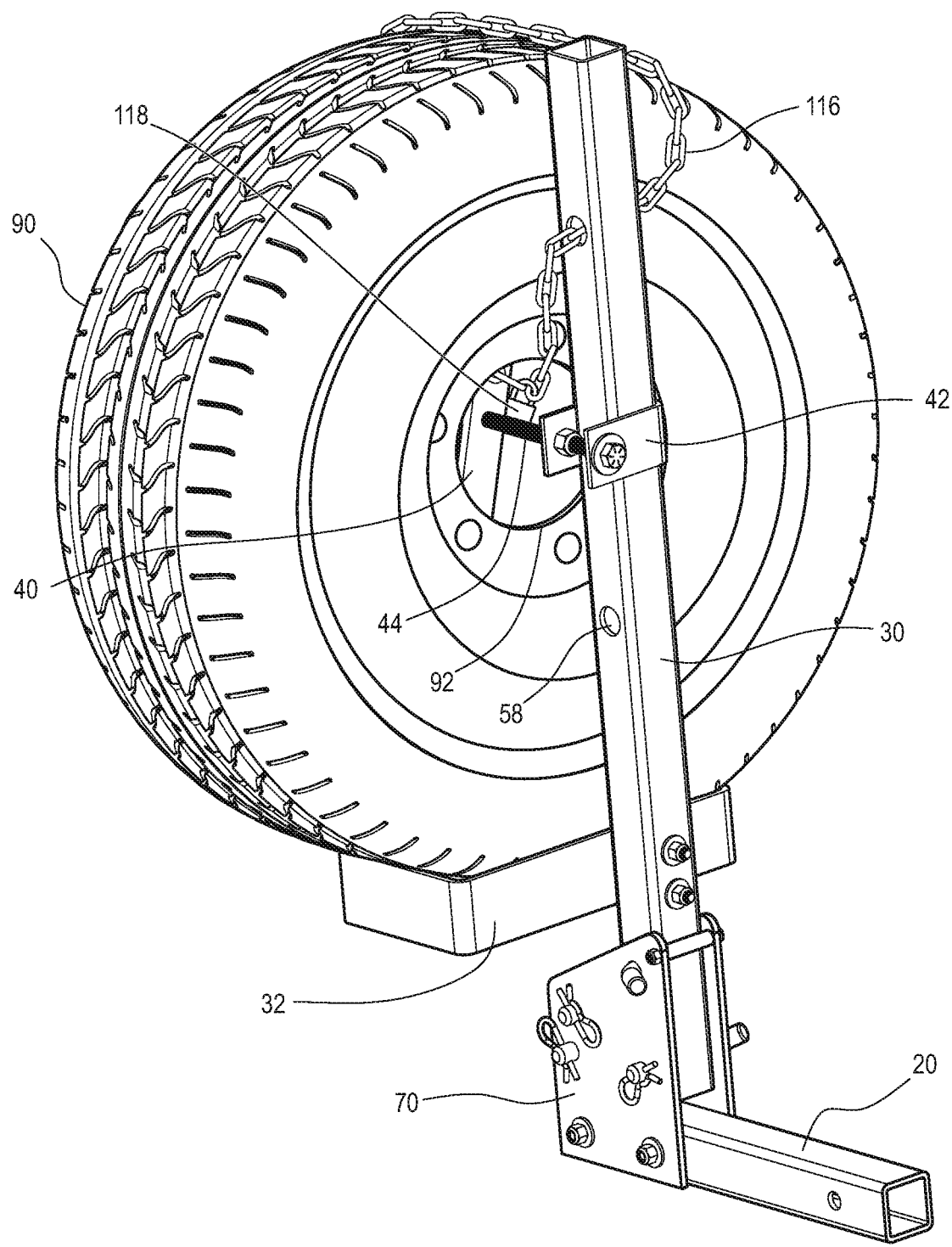

FIGS. 4f and 4g show tire 90 resting on carrier 10 with the storage of the tire complete. Tire 90 rests on bracket 32. Bolt 44 extends through opening 92 of tire 90. Retainer plate 40 is disposed on retainer bolt 44 with the bolt extending through opening 402. Washer 54 and nut 56 are disposed on bolt 44 to hold retainer plate 40 on the bolt. A lock washer can be disposed between washer 54 and nut 56 to reduce the likelihood of the nut falling off bolt 44 accidentally. Nut 56 could also be a locking nut. In other embodiments, nut 56 is welded or otherwise attached to retainer plate 40. All nuts and bolts included with carrier 10 should be tightened prior to or at this stage.

Retainer plate 40 is wider than opening 92 of tire 90 so that as nut 56 is tightened down on bolt 44 the retainer plate presses against the tire. Nut 56 can be tightened down fairly tightly to press tire 90 against support tube 30 and limit the movement of the tire during storage. A ⅜-inch or ½-inch wrench should be used to ensure nut 56 is sufficiently tight. Tire 90 is removed from carrier 10 by unscrewing nut 56 and removing retainer plate 40, then lifting the tire off carrier 10. With tire 90 removed, carrier 10 can be removed from vehicle 100 and stored in one piece by removing pin 106.

A chain, cable, rope, or other suitable mechanism can be threaded through opening 92 of tire 90 and openings 58 of support tube 30 as an extra layer of safety and security. FIGS. 4f and 4g show a chain 116 with padlock 118. Chain 116 is threaded through the upper openings 58, around one side of tire 90, and through opening 92. Chain 116 operates as an extra retaining mechanism in case retaining plate 40 fails by breaking, by nut 56 coming unscrewed, or in any other failure mode of the retaining plate. Chain 116 will greatly reduce the likelihood that tire 90 falls from carrier 10 while driving. Using a padlock 118 also provides security against theft of tire 90 from carrier 10.

Figure 5A:
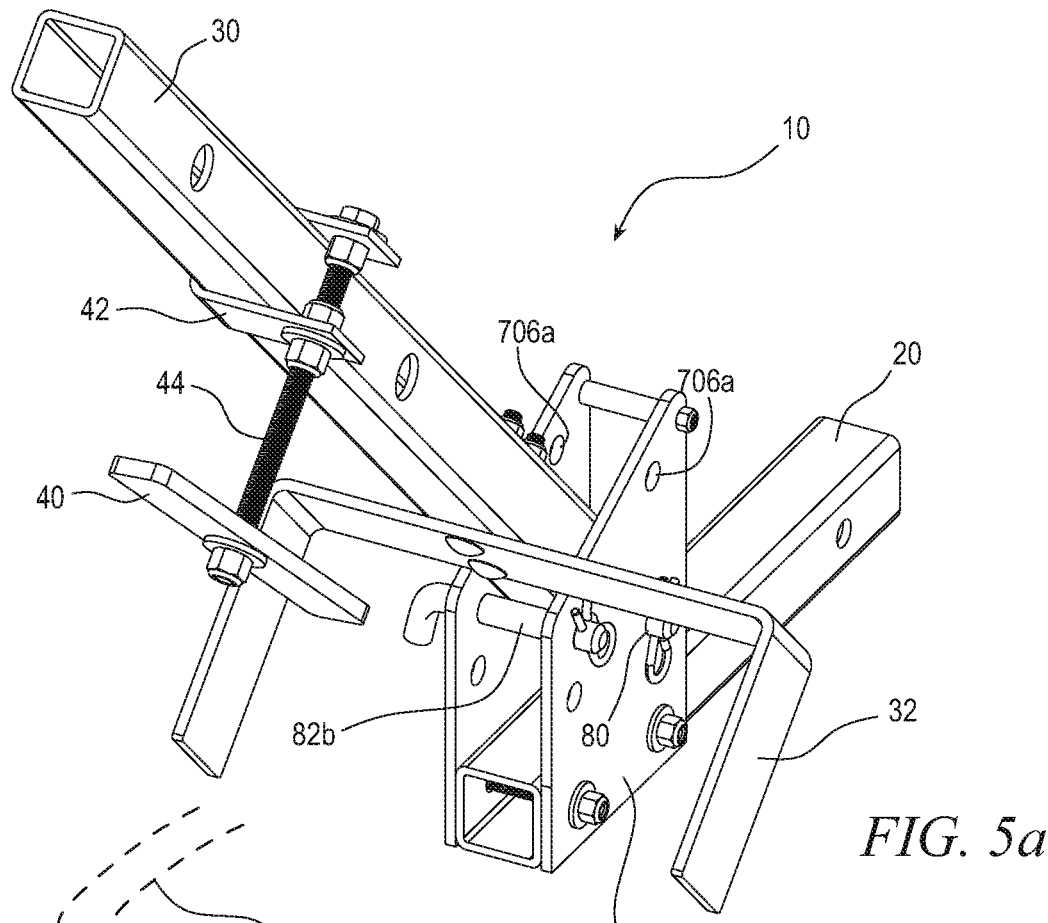
FIGS. 5a-5g illustrate various lowered positions of the spare tire carrier.
Figure 5B:
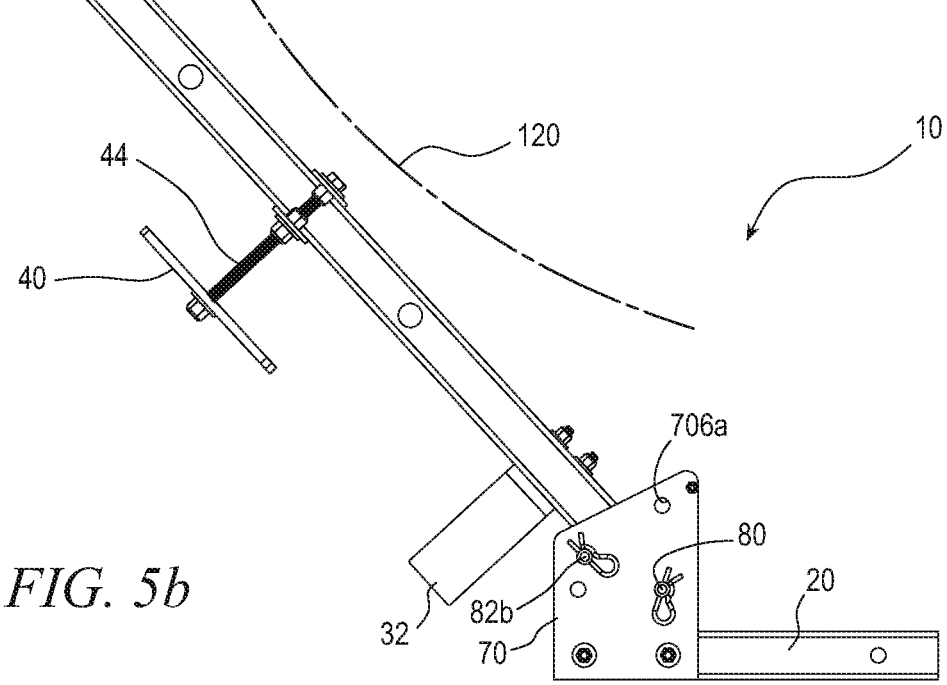

FIGS. 5a-5g show carrier 10 in lowered positions. FIGS. 5a and 5b illustrate the first lowered position, which is approximately a 45-degree angle between support tube 30 and vertical. To lower support tube 30 to the first lowered position, pin 82a is removed to allow the support tube to pivot around pin 80. Pin 82b remains in side plates 70, and support tube 30 is then lowered to rest on pin 82b. Pin 82a can be reinstalled into openings 706a after lowering support tube 30 to reduce the likelihood of losing the pin. Alternatively, a single pin 82 can be used and simply moved between openings 706a-706c as desired.

The first lowered position holds support tube 30 at an angle that is generally low enough to allow rear door 102 to be opened. FIG. 5b shows arc 120 that door 102 makes as the door opens and closes. The first lowered position provides just enough clearance to allow the door to open without contacting carrier 10. The exact position of opening 706b can be customized to a particular vehicle to provide a near exact minimum clearance for the vehicle's rear door or tailgate, e.g., with door 102 swinging within an inch of support tube 40. A slightly lower-diameter bolt 82b can be used to provide a slightly greater clearance for a particular vehicle if the door hits carrier 10 in the first lowered position.

The first lowered position in FIGS. 5a and 5b will usually be the position that will be used the most because it allows full access to the back of the vehicle and can easily be returned to the vertical position without having to lift the full weight of the tire. However, pin 82b only limits downward motion of support tube 30, so the support tube is still free to rotate around pin 80 above pin 82b. Driving while carrier 10 is lowered should only be done if a pin 82 is disposed through one set of openings 706 of side plates 70 and openings 306 of support tube 30 to secure the support tube and tire 90 in the lowered position.

Figure 5C:
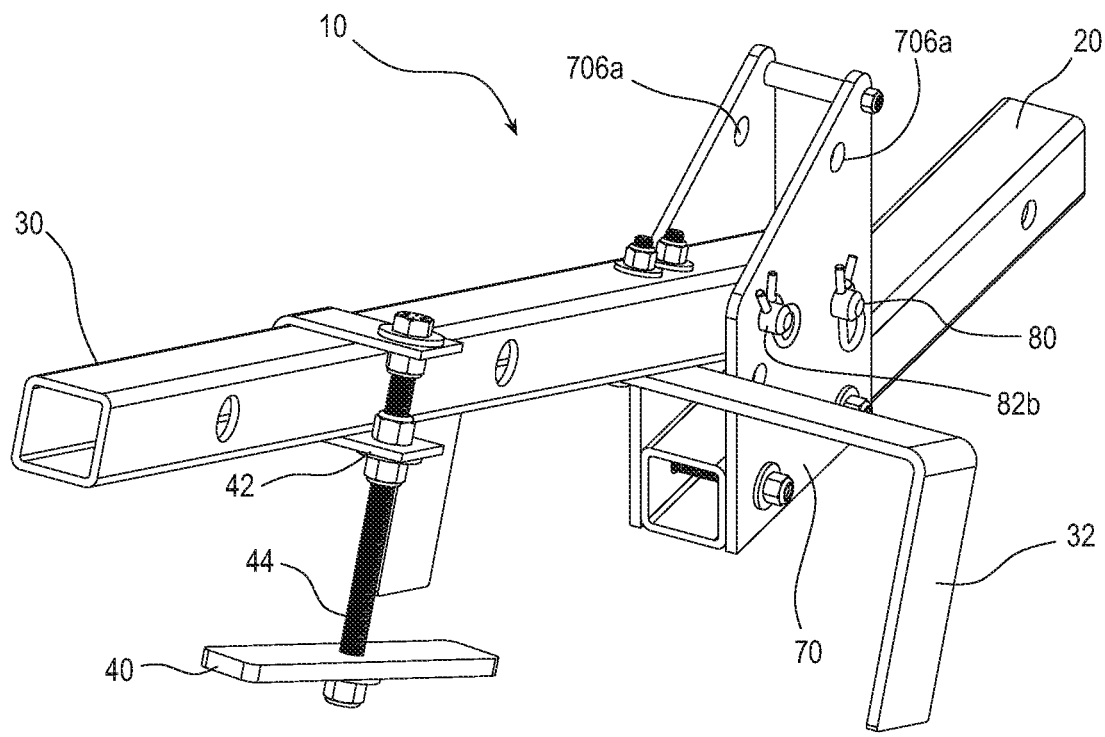
Figure 5D:
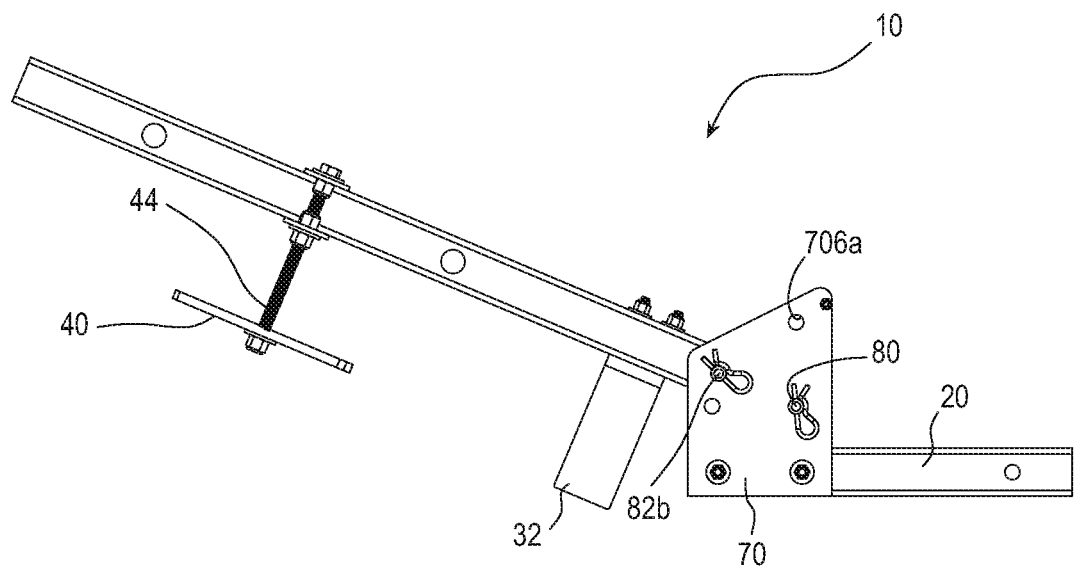
Figure 5E:
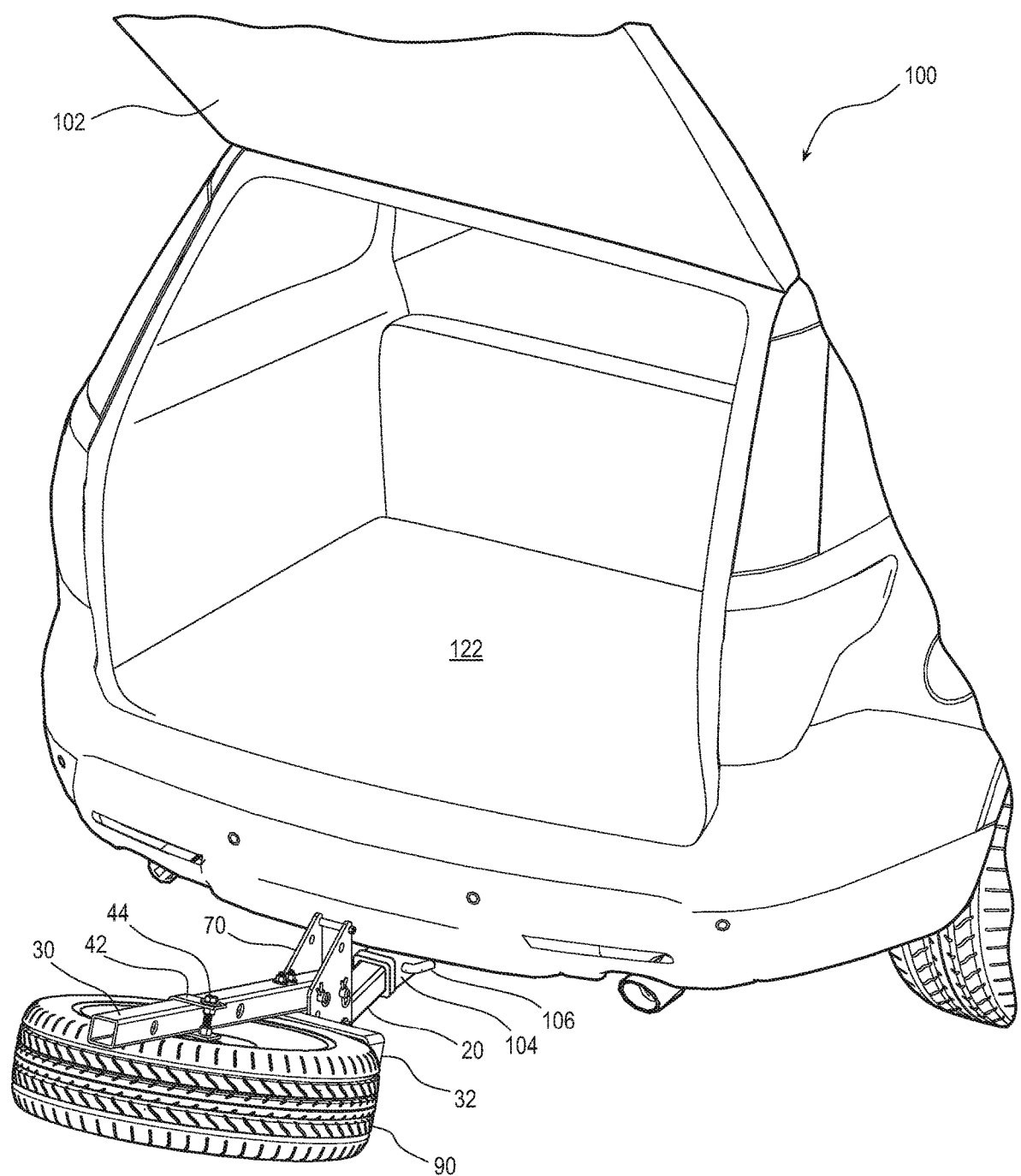

A second lowered position is illustrated in FIGS. 5c-5e. The second lowered position is achieved by removing pin 82b, allowing support tube 30 to be lowered until openings 306 of the support tube are aligned with openings 706b of side plates 70, and then reinserting pin 82b. Having pin 82b positioned through support tube 30 limits the movement of the support tube in both the upward and downward direction, which means that the second lowered position is safer for use while driving the vehicle.

The second lowered position also provides sufficient access to cargo areas of SUVs or beds of trucks, as illustrated in FIG. 5d where cargo area 122 of vehicle 100 is accessible. The second lowered position is a good option for longer-term use because the vehicle can be loaded, driven, and then unloaded repeatedly without having to adjust carrier 10. The second lowered position also allows travel with furniture, lumber, or other longer cargo that extends out of the rear of the vehicle beyond cargo area 122 or beyond the end of the bed of a truck.

Figure 5F:
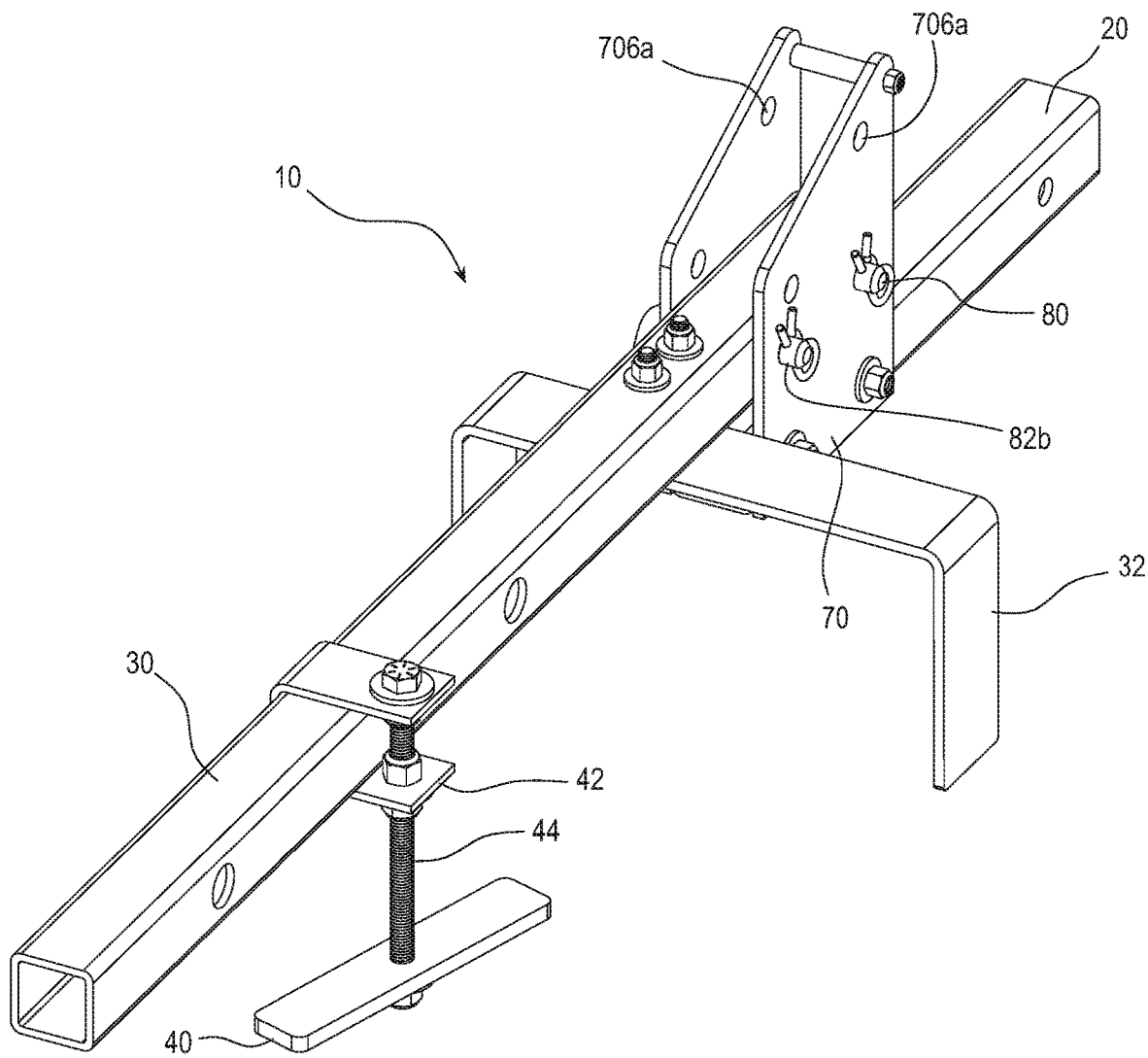
Figure 5G:
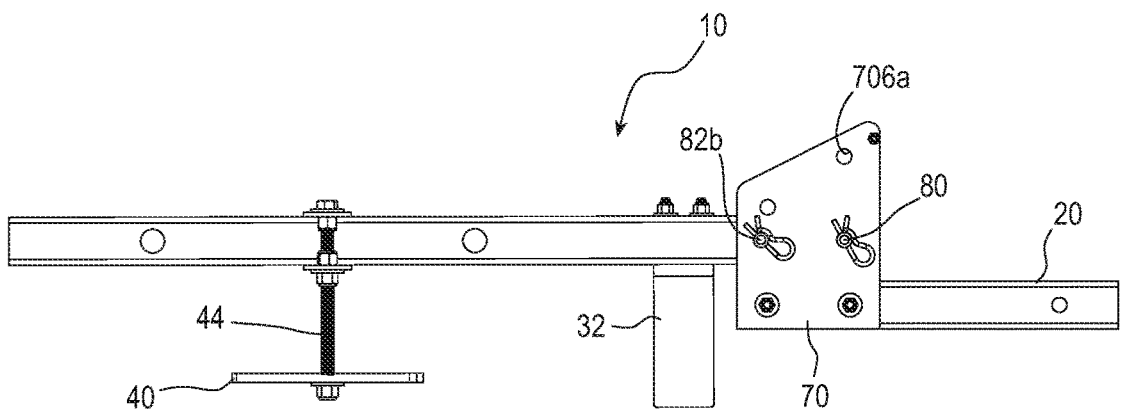

FIGS. 5f and 5g illustrate carrier 10 in a third lowered position, or the horizontal position. Pin 82b is removed to release support tube 30 from the first or second lowered positions. Pin 82a will also need to be removed if support tube 30 is being changed from the vertical position. The horizontal position can provide a flat surface for placing things on the tire or for installing a structural platform for use as a table or other utility. The horizontal position may also be needed for some vehicles in order to fully access a cargo area.

Spare tire carrier 10 allows a full-size spare tire to be carried, providing peace of mind in travelling longer distances that a tire failure would not be catastrophic. The spare tire carrier with multiple lowered positions allows avoiding more frequent handling and the space requirement of carrying a spare tire with other types of holders. There is no need to move or readjust carrier 10 each time a cargo area is accessed. Spare tire carrier 10 also makes it easier to carry a damaged tire to a repair facility. Only a screw nut wrench is required to place the damaged tire on the carrier.

While an SUV is illustrated, the designs and features of spare tire carrier 10 apply equally to pickups with a tailgate that lowers, or any other vehicle with a trailer hitch receiver. The specific lengths, widths, heights, thicknesses, and other measurements given above are all generally subject to modification as needed to fit differently sized trailer hitches, to increase strength, reduce costs, or for any other reason. Every part of carrier 10 is formed from steel unless otherwise indicated. In other embodiments, aluminum, copper, titanium, or other metals are used for some parts. Any other suitable material may be used as long as the material meets the load bearing requirements of a particular part. The specific order of steps described and illustrated above are merely a suggestion. The disclosed instructions can be performed in other suitable orders. The term locking nut can refer to either a nut with an integrated locking washer, or a normal nut used in combination with a separate locking washer. The term spare tire can refer to a tire that is specifically designated as being a spare, or any other tire.

While one or more embodiments of the present invention have been illustrated in detail, the skilled artisan will appreciate that modifications and adaptations to those embodiments may be made without departing from the scope of the present invention as set forth in the following claims.

What is claimed:

1. A tire carrier, comprising:
   a base tube;
   a first side plate attached to the base tube;
   a second side plate attached to the base tube opposite the first side plate;
   a first bolt disposed through the first side plate, base tube, and second side plate;
   a second bolt disposed through the first side plate, base tube, and second side plate;
   a first pin disposed through a first opening of the first side plate and a first opening of the second side plate, wherein the first pin extends directly over the base tube;
   a support tube comprising a first opening formed through the support tube and a second opening formed through the support tube a first distance from the first opening of the support tube, wherein the support tube is configured to pivot around the first pin with the first pin disposed through the first opening of the support tube;
   a pair of second openings formed through the first side plate and second side plate, wherein the second openings of the first side plate and second side plate are horizontally aligned with each other and with the first openings of the first side plate and second side plate, wherein a line from the second opening of the first side plate to the second opening of the second side plate extends directly over the base tube, and wherein the second opening of the first side plate is the first distance from the first opening of the first side plate and the second opening of the second side plate is the first distance from the first opening of the second side plate;
   a pair of third openings formed through the first side plate and second side plate, wherein the third openings of the first side plate and second side plate are horizontally aligned with each other and vertically aligned with the first openings of the first side plate and second side plate, and wherein the third opening of the first side plate is the first distance from the first opening of the first side plate and the third opening of the second side plate is the first distance from the first opening of the second side plate;

a pair of fourth openings formed through the first side plate and second side plate, wherein the fourth openings of the first side plate and second side plate are horizontally aligned with each other and at a first angle from vertical relative to the first openings of the first side plate and second side plate, wherein the first angle is configured to allow a vehicle door to swing within an inch of the support tube without hitting the support tube when an outside side surface of the support tube is aligned with the fourth openings, and wherein the fourth opening of the first side plate is the first distance from the first opening of the first side plate and the fourth opening of the second side plate is the first distance from the first opening of the second side plate;

a tire support bracket attached to the support tube by a third bolt and a fourth bolt extending through the support tube and the tire support bracket, wherein the tire support bracket is formed from a first sheet of steel bent to form a first arm and second arm, wherein the first arm and second arm are configured to support a weight of a spare tire set on the tire support bracket, wherein the first arm of the tire support bracket is a second distance from a center of the support tube, and wherein the second arm of the tire support bracket is a third distance from the center of the support tube different from the second distance;

a spare tire holding bracket comprising a second sheet of steel bent to include a first arm and a second arm with the support tube disposed between the first arm and second arm of the spare tire holding bracket;

a retainer bolt extending through a first opening in the first arm of the spare tire holding bracket and a second opening in the second arm of the spare tire holding bracket, wherein the retainer bolt extends in a direction parallel to the first arm and second arm of the tire support bracket and is disposed equidistant from the first arm and second arm of the tire support bracket;

a first nut disposed on the retainer bolt between the first arm and second arm of the spare tire holding bracket, wherein the first nut is tightened down against a head of the retainer bolt with the first arm of the spare tire holding bracket disposed between the first nut and head;

a second nut disposed on the retainer bolt between the first arm and second arm of the spare tire holding bracket; and a third nut disposed on the retainer bolt on a complete opposite side of the first arm and second arm of the spare tire holding bracket from the head of the retainer bolt, wherein the third nut is tightened down on the second arm of the spare tire holding bracket to clamp the first arm and second arm of the spare tire holding bracket down onto the support tube.

2. The tire carrier of claim 1, further including a retainer plate disposed on the retainer bolt.

3. The tire carrier of claim 1, further including a second pin disposed through the second openings of the first side plate, second side plate, and support tube, wherein the support tube is oriented parallel to the base tube, and wherein a footprint of the support tube overlaps a footprint of the base tube for an entire distance between the first pin and second pin.

4. The tire carrier of claim 1, further including a second pin disposed through the fourth openings of the first side plate and second side plate, wherein the support tube is resting on the second pin without the second pin extending through the second opening of the support tube.

5. The tire carrier of claim 1, further including a second pin disposed through the second opening of the support tube and the third openings of the first side plate and second side plate, and wherein the support tube is oriented perpendicularly to the base tube.

6. The tire carrier of claim 1, wherein the second nut is physically separated from the second arm of the tire support bracket.

7. A tire carrier, comprising:
a base tube;
a first side plate attached to the base tube;
a second side plate attached to the base tube opposite the first side plate, wherein an end of the base tube aligns with a side surface of the first side plate and a side surface of the second side plate;
a first pin extending through the first side plate and second side plate;
a support tube pivotally attached to the base tube by the first pin;
a tire support bracket attached to the support tube, wherein the tire support bracket is formed from a first sheet of steel bent to form a first arm and a second arm, and wherein the first arm and second arm of the tire support bracket are oriented off-center from the support tube;
a spare tire holding bracket comprising a first arm and a second arm with the support tube disposed between the first arm and second arm of the spare tire holding bracket;
a retainer bolt extending through the first arm and second arm of the spare tire holding bracket, wherein the retainer bolt extends in a direction parallel to the first arm and second arm of the tire support bracket and is disposed centered over the tire support bracket;
a first nut disposed on the retainer bolt between the first arm and second arm of the spare tire holding bracket;
a second nut disposed on the retainer bolt between the first arm and second arm of the spare tire holding bracket; and
a third nut disposed on the retainer bolt outside of the first arm and second arm of the spare tire holding bracket.

8. The tire carrier of claim 7, further including a plurality of openings formed through the first side plate and second side plate for limiting rotation of the support tube at a plurality of predefined angles.

9. The tire carrier of claim 8, wherein the plurality of predefined angles includes vertical, horizontal, and a third angle that is nonvertical and nonhorizontal, wherein the third angle is configured such that a side surface of the support tube is resting on a second pin disposed through one of the openings in the first side plate and a corresponding one of the openings in the second side plate without the second pin extending through an opening in the support tube.

10. The tire carrier of claim 7, wherein the spare tire holding bracket and retainer bolt in combination extend completely around the support tube.

11. The tire carrier of claim 7, wherein the first nut is tightened against the first arm of the spare tire holding bracket and the second nut is tightened against the second arm of the spare tire holding bracket to increase a distance of separation between the first arm and second arm of the spare tire holding bracket.

12. The tire carrier of claim 7, wherein the third nut is tightened against the second arm of the spare tire holding bracket to clamp the support tube between the first arm and second arm of the spare tire holding bracket.

13. A method of storing a tire on a vehicle, comprising:
mounting a base tube to a trailer hitch receiver;
attaching a first side plate to the base tube;
attaching a second side plate to the base tube opposite the first side plate;
pivotally attaching a support tube between the first side plate and second side plate by extending a first pin through a first opening of the support tube, a first opening of the first side plate, and a first opening of the second side plate;
disposing a second pin through a second opening of the support tube, a second opening of the first side plate, and a second opening of the second side plate, wherein the second openings are vertically aligned with the first openings;
disposing a third pin through a third opening of the first side plate and a third opening of the second side plate while the second pin remains extending through the second openings of the first side plate, second side plate, and support tube;
removing the second pin from the second openings;
rotating the support tube down to rest on the third pin after removing the second pin and without removing the third pin;
attaching a retainer bolt to the support tube;
disposing the tire around the retainer bolt;
disposing a retainer plate on the retainer bolt with the tire between the retainer plate and support tube;
providing a spare tire holding bracket comprising a first arm and a second arm;
disposing the spare tire holding bracket with the support tube between the first arm and second arm; and
disposing the retainer bolt through openings of the first arm and second arm.

14. The method of claim 13, further including:
removing the third pin; and
disposing the pin or a third pin through the third openings of the first side plate and second side plate and the second opening in the support tube.

15. The method of claim 14, further including opening a rear door of the vehicle while the support tube remains resting on the third pin, wherein the rear door swings within an inch of the support tube without contacting the support tube.

16. The method of claim 13, further including disposing a chain through the tire and through an opening in the support tube.

17. The method of claim 13, further including:
disposing a first nut on the retainer bolt between the first arm and second arm;
disposing a second nut on the retainer bolt between the first arm and second arm; and
disposing a third nut on the retainer bolt outside of an area between the first arm and second arm.

* * * * *

UNITED STATES PATENT AND TRADEMARK OFFICE
CERTIFICATE OF CORRECTION

PATENT NO. : 10,974,777 B1  
APPLICATION NO. : 16/803721  
DATED : April 13, 2021  
INVENTOR(S) : Larry Ackerman Page 1 of 1

It is certified that error appears in the above-identified patent and that said Letters Patent is hereby corrected as shown below:

In the Claims

Column 14, Line 13, Claim 14 after the words "disposing the", delete the words "pin or a".

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*